(12) United States Patent
Yoshikawa et al.

(10) Patent No.: US 11,786,987 B2
(45) Date of Patent: Oct. 17, 2023

(54) FRICTION STIR WELDING TOOL AND FRICTION STIR WELDING METHOD

(71) Applicant: KAWASAKI JUKOGYO KABUSHIKI KAISHA, Kobe (JP)

(72) Inventors: Syuhei Yoshikawa, Kobe (JP); Ryoichi Hatano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 257 days.

(21) Appl. No.: 17/293,746

(22) PCT Filed: Aug. 5, 2019

(86) PCT No.: PCT/JP2019/030766
§ 371 (c)(1),
(2) Date: May 13, 2021

(87) PCT Pub. No.: WO2020/100358
PCT Pub. Date: May 22, 2020

(65) Prior Publication Data
US 2022/0009024 A1 Jan. 13, 2022

(30) Foreign Application Priority Data
Nov. 13, 2018 (JP) .................................. 2018-213170

(51) Int. Cl.
*B23K 20/00* (2006.01)
*B23K 20/12* (2006.01)

(52) U.S. Cl.
CPC ................................ *B23K 20/1255* (2013.01)

(58) Field of Classification Search
CPC ............. B23K 20/1255; B23K 20/123; B23K 20/125; B23K 20/126; B23K 20/12;
(Continued)

(56) References Cited

U.S. PATENT DOCUMENTS

| 6,595,403 B2 * | 7/2003 | Okamura | ............. | B23K 20/125 |
| | | | | 228/112.1 |
| 7,686,202 B1 * | 3/2010 | Carter | .................. | B23K 20/126 |
| | | | | 228/2.1 |

(Continued)

FOREIGN PATENT DOCUMENTS

| CN | 108581178 A | 9/2018 |
| EP | 2 995 411 A1 | 3/2016 |

(Continued)

OTHER PUBLICATIONS

Aug. 5, 2022 European Search Report issued for European Patent No. 19 884 243.7.

*Primary Examiner* — Erin B Saad
(74) *Attorney, Agent, or Firm* — Oliff PLC

(57) ABSTRACT

A friction stir welding tool and method, by which influence on durability of the tool is suppressed even when resistance force generated when the tool moves for joining acts on facing end portions of workpieces which are located close to an attachment side of the tool. The tool includes: a stirring shaft; a first shoulder portion provided to be unrotatable relative to the shaft and configured to rotate together with the shaft when it rotates; a second shoulder portion provided to be unrotatable relative to the shaft and configured to rotate together with the shaft when it rotates; and a third shoulder portion attached around the shaft located between the first and second shoulder portions, and includes an inclination preventing portion to prevent inclination of the shaft by contacting the workpieces to receive reaction force from the workpieces when the shaft is made to move along joining lines.

13 Claims, 11 Drawing Sheets

(58) Field of Classification Search
CPC .............. B23K 20/122; B23K 20/1245; B23K 20/1265; B23K 20/124; B23K 20/127; B23K 20/128; B23K 2101/045; B23K 37/0235; B23K 37/0282; B23K 37/0294
See application file for complete search history.

(56) References Cited

U.S. PATENT DOCUMENTS

| | | | |
|---|---|---|---|
| 2002/0073888 A1* | 6/2002 | Okada | B61D 17/043 105/396 |
| 2007/0152015 A1* | 7/2007 | Burton | B23K 20/1255 228/2.1 |
| 2009/0230173 A1* | 9/2009 | Stol | B23K 20/125 228/2.3 |
| 2016/0074957 A1* | 3/2016 | Nishida | B23K 20/123 228/114.5 |
| 2017/0157720 A1* | 6/2017 | Sato | B23K 20/12 |
| 2017/0304934 A1* | 10/2017 | Carlson | B23K 20/1265 |
| 2019/0210149 A1* | 7/2019 | Fujii | B23K 20/1255 |

FOREIGN PATENT DOCUMENTS

| | | |
|---|---|---|
| JP | 2003-260574 A | 9/2003 |
| JP | 2014-133236 A | 7/2014 |
| JP | 5848528 B2 | 1/2016 |

* cited by examiner

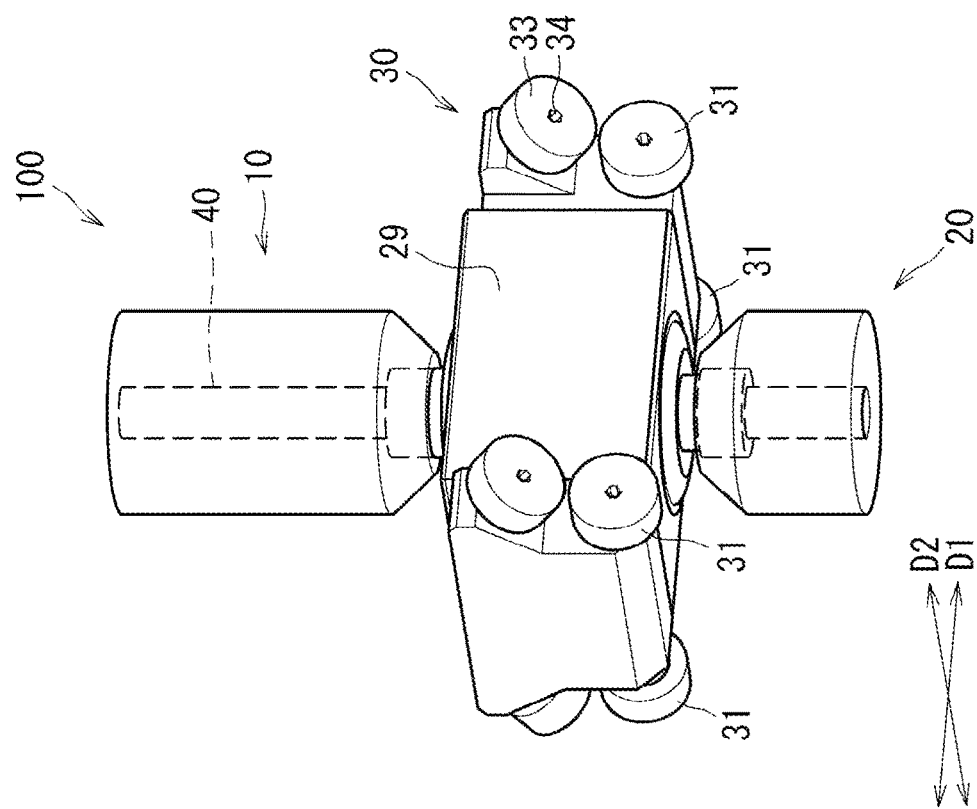
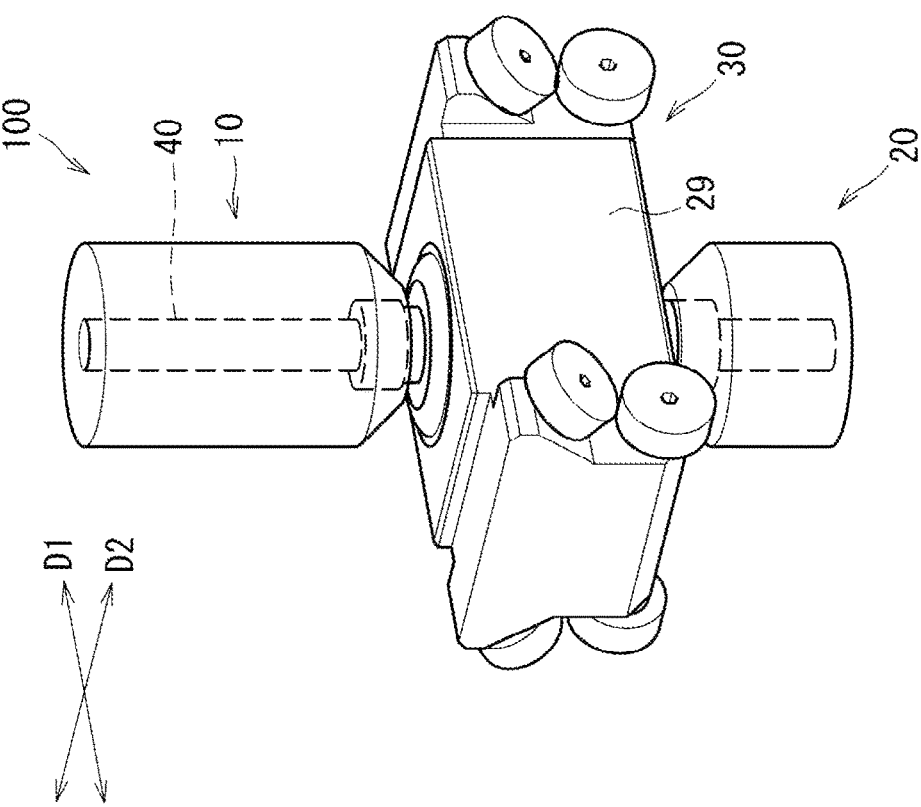
FIG. 1A
FIG. 1B

FRICTION STIR WELDING TOOL AND FRICTION STIR WELDING METHOD

TECHNICAL FIELD

The present invention relates to a friction stir welding tool and a friction stir welding method which are used when plates are joined to each other by friction stir welding.

BACKGROUND ART

Friction stir welding is conventionally used when end portions of plates are made to face each other and are joined to each other. As the friction stir welding, a technique in which double skin members each formed by coupling two plate-shaped members by a rib-shaped member are coupled to each other by a bobbin tool has been proposed. PTL 1 discloses a tool for use in such friction stir welding.

CITATION LIST

Patent Literature

PTL 1: Japanese Laid-Open Patent Application Publication No. 2003-260574

SUMMARY OF INVENTION

Technical Problem

PTL 1 discloses a bobbin tool type friction stir welding tool including: a stirring shaft; an upper shoulder arranged around the stirring shaft so as to be located at an upper portion of the stirring shaft; a lower shoulder arranged around the stirring shaft so as to be located at a lower portion of the stirring shaft; and an intermediate shoulder arranged around the stirring shaft so as to be located between the upper shoulder and the lower shoulder. The upper shoulder, the lower shoulder, and the intermediate shoulder are arranged on a straight line and are formed integrally as a whole. When the friction stir welding is performed by using such friction stir welding tool, the friction stir welding tool moves along a line at which workpieces face each other, and performs joining of plates at two positions that are a position between the upper shoulder and the intermediate shoulder and a position between the intermediate shoulder and the lower shoulder. Therefore, according to the friction stir welding tool, the plates are joined to each other simultaneously at two positions that are upper and lower positions.

At this time, resistance force in a direction opposite to a movement direction of the friction stir welding tool which performs the friction stir welding acts on the stirring shaft of the friction stir welding tool at the two positions. Especially, at a position of a portion of the stirring shaft of the friction stir welding tool which portion is attached to an apparatus main body which holds the friction stir welding tool, the resistance force acts, and in addition, a relatively large rotational moment generated by the resistance force acting on a portion opposite to the portion attached to the apparatus main body also acts.

Moreover, when a thickness of the double skin member is large, a length between two gaps that are upper and lower gaps may become large. In this case, a larger rotational moment acts at the position of the portion of the stirring shaft of the friction stir welding tool which portion is attached to the main body. Therefore, the stirring shaft may be bent, and therefore, durability of the friction stir welding tool may be influenced.

The present invention was made under the above circumstances, and an object of the present invention is to provide a friction stir welding tool and a friction stir welding method, each of which suppresses influence on durability of the friction stir welding tool even when resistance force generated by movement of the friction stir welding tool for joining acts on a stirring shaft.

Solution to Problem

A friction stir welding tool of the present invention is a tool configured to perform friction stir welding of first and second facing portions each constituted by making a plurality of end portions of workpieces face each other. The friction stir welding tool includes: a stirring shaft; a first shoulder portion configured to be unrotatable relative to the stirring shaft and rotate together with the stirring shaft when the stirring shaft rotates; a second shoulder portion configured to be unrotatable relative to the stirring shaft and rotate together with the stirring shaft when the stirring shaft rotates; and a third shoulder portion attached around the stirring shaft so as to be located at a position between the first shoulder portion and the second shoulder portion. A first gap portion into which the first facing portion is inserted is formed between the first shoulder portion and the third shoulder portion. A second gap portion into which the second facing portion is inserted is formed between the second shoulder portion and the third shoulder portion. The third shoulder portion includes an inclination preventing portion configured to prevent inclination of the stirring shaft during the friction stir welding by contacting the workpieces to receive reaction force from the workpieces.

According to the friction stir welding tool configured as above, since the inclination of the stirring shaft is prevented by the inclination preventing portion, bending of the stirring shaft can be suppressed. Therefore, the durability of the friction stir welding tool can be improved.

A friction stir welding method of the present invention is a friction stir welding method of performing friction stir welding by using a friction stir welding tool, the friction stir welding tool including: a stirring shaft; a first shoulder portion provided so as to be unrotatable relative to the stirring shaft and configured to rotate together with the stirring shaft when the stirring shaft rotates; a second shoulder portion provided so as to be unrotatable relative to the stirring shaft and configured to rotate together with the stirring shaft when the stirring shaft rotates; and a third shoulder portion attached around the stirring shaft so as to be located at a position between the first shoulder portion and the second shoulder portion. The friction stir welding method includes: sandwiching facing end portions of workpieces in a first gap portion formed between the first shoulder portion and the third shoulder portion; sandwiching facing end portions of the workpieces in a second gap portion formed between the second shoulder portion and the third shoulder portion; and performing the friction stir welding when the stirring shaft rotates and moves along joining lines of the workpieces while preventing inclination of the stirring shaft in such a manner that the third shoulder portion contacts the workpieces to receive reaction force from the workpieces.

According to the friction stir welding method designed as above, in the step of performing the friction stir welding, the friction stir welding is performed while preventing the inclination of the stirring shaft. Therefore, the bending of the stirring shaft can be suppressed. Thus, the durability of the friction stir welding tool can be improved.

Advantageous Effects of Invention

According to the present invention, since the inclination of the stirring shaft is prevented, the bending of the stirring shaft can be suppressed, and the durability of the friction stir welding tool can be improved. Therefore, the friction stir welding tool can be used for a long period of time, and an operating cost of an apparatus which performs the friction stir welding can be reduced.

BRIEF DESCRIPTION OF DRAWINGS

FIGS. 1A and 1B are perspective views showing a friction stir welding tool according to Embodiment 1 of the present invention. FIG. 1A is a diagram when viewed obliquely from above, and FIG. 1B is a diagram when viewed obliquely from below.

FIG. 8A shows that upper plates of the workpieces are convex upward, and FIG. 8B shows that the upper plates of the workpieces are convex downward.

DESCRIPTION OF EMBODIMENTS

Embodiment 1

Figure 2:
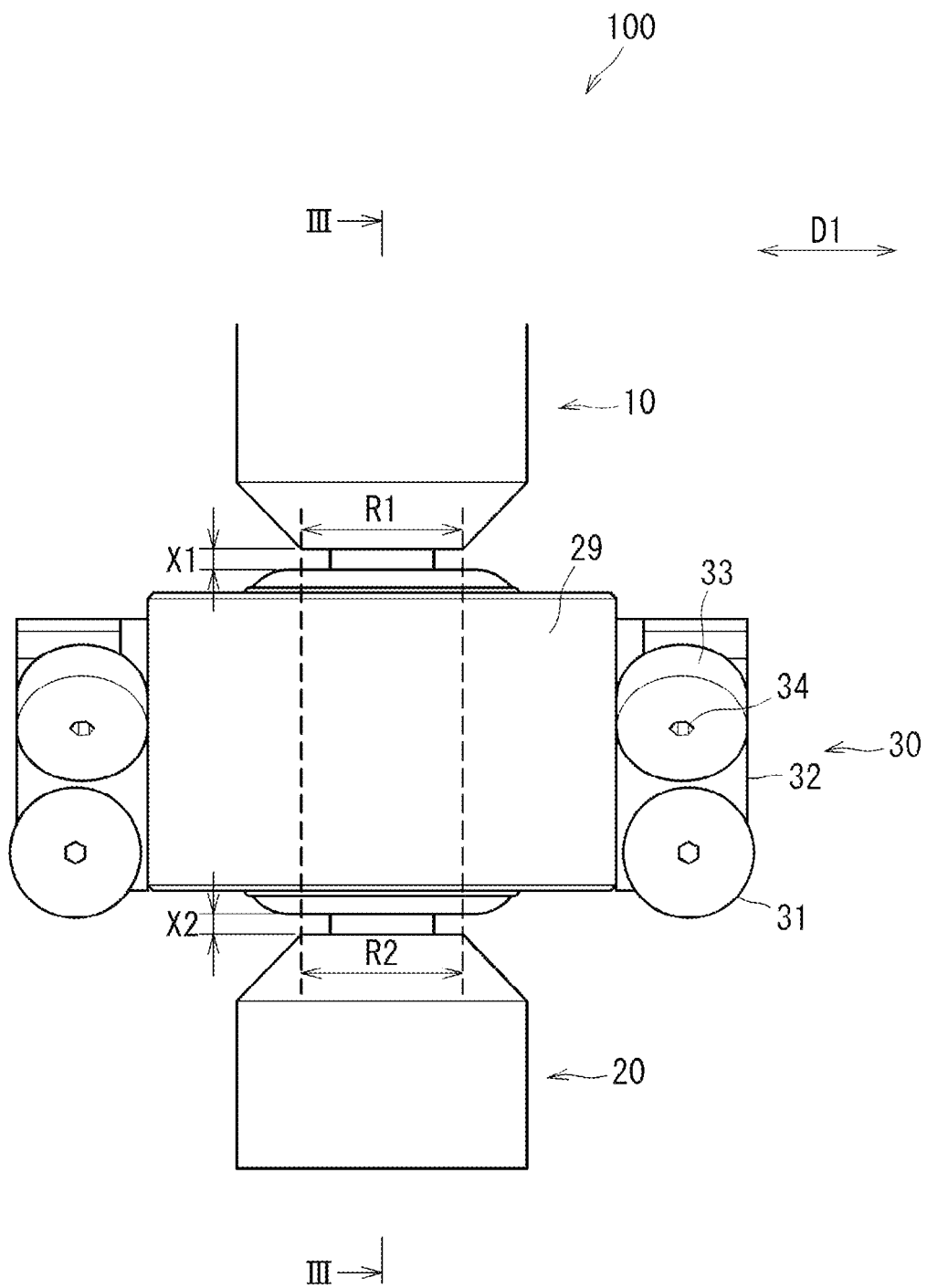
FIG. 2 is a side view showing the friction stir welding tool shown in FIGS. 1A and 1B.
Figure 3:
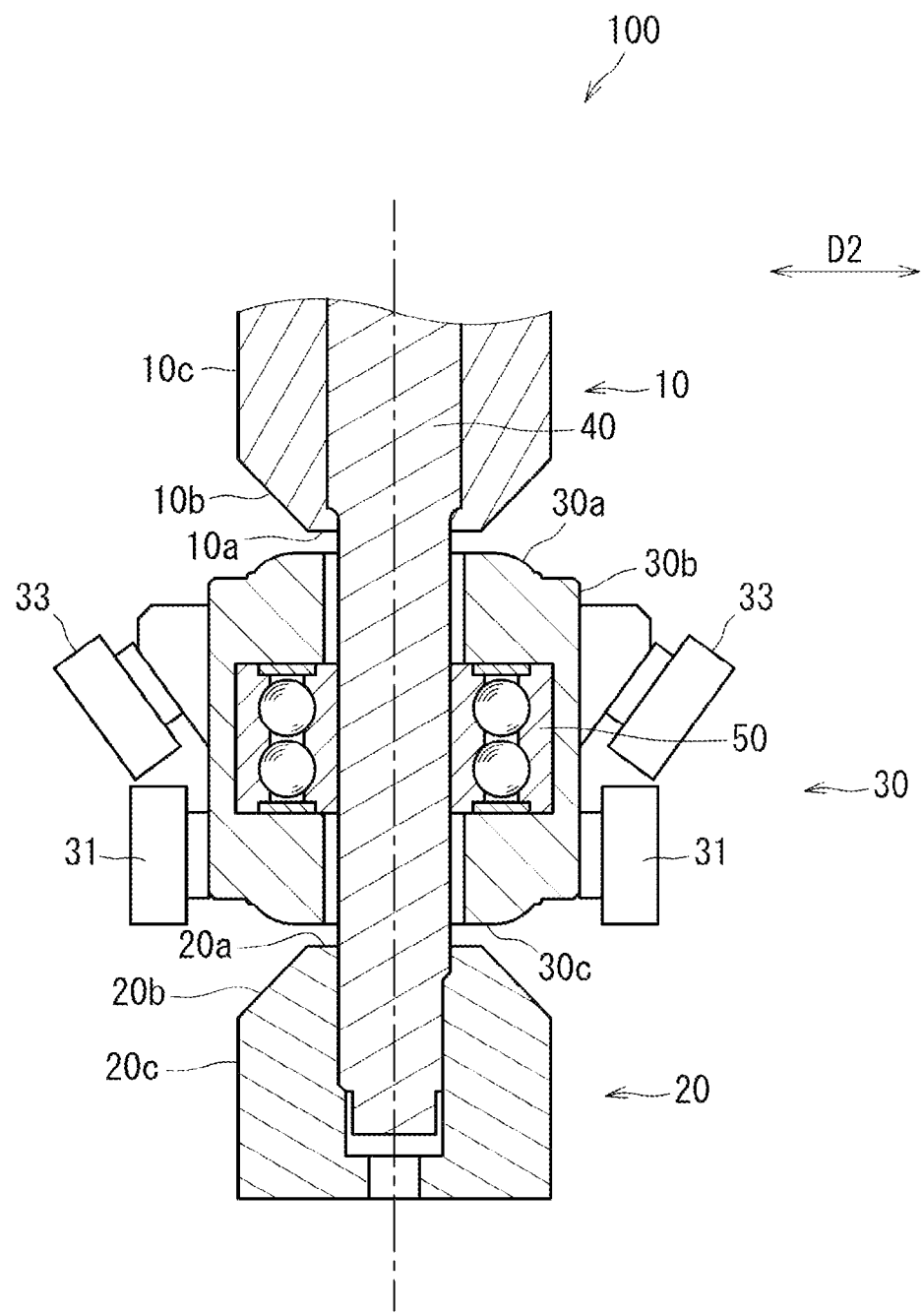
FIG. 3 is a sectional view taken along line of FIG. 2.

Hereinafter, a friction stir welding tool according to Embodiment 1 of the present invention will be described with reference to the attached drawings. FIG. 1A is a perspective view showing a friction stir welding tool 100 according to Embodiment 1 when viewed obliquely from above. FIG. 1B is a perspective view showing the friction stir welding tool 100 according to Embodiment 1 when viewed obliquely from below. FIG. 2 is a side view showing the friction stir welding tool 100. FIG. 3 is a sectional view showing the friction stir welding tool 100. FIG. 3 is a sectional view taken along line of FIG. 2.

As shown in FIGS. 1A to 3, the friction stir welding tool 100 of the present embodiment includes an upper shoulder (first shoulder portion) 10, a lower shoulder (second shoulder portion) 20, an intermediate shoulder (third shoulder portion) 30, and a stirring shaft 40. The intermediate shoulder 30 is arranged at a position between the upper shoulder 10 and the lower shoulder 20.

The stirring shaft 40 is arranged so as to pass through an inside of the upper shoulder 10 and an inside of the lower shoulder 20. The stirring shaft 40 has a columnar shape that is relatively long in an axial direction thereof. The upper shoulder 10 and the lower shoulder 20 are attached around the stirring shaft 40.

Since the stirring shaft 40 passes through the inside of the upper shoulder 10 and the inside of the lower shoulder 20, and the upper shoulder 10 and the lower shoulder 20 are fixed around an axis of the stirring shaft 40, the upper shoulder 10 and the lower shoulder 20 are unrotatable relative to the stirring shaft 40. Therefore, in the friction stir welding tool 100, when the stirring shaft 40 is rotated, the upper shoulder 10 and the lower shoulder 20 also rotate together with the stirring shaft 40.

The intermediate shoulder 30 is attached to the stirring shaft 40 through a bearing 50. The stirring shaft 40 is arranged so as to pass through an inside of the intermediate shoulder 30. In the present embodiment, the bearing 50 is, for example, a radial bearing. The intermediate shoulder 30 is rotatably attached around the axis of the stirring shaft 40 through the bearing 50. Therefore, even when the stirring shaft 40 rotates, the intermediate shoulder 30 does not rotate integrally with the stirring shaft 40. To be specific, the intermediate shoulder 30 is configured to be able to be prevented from performing the same rotation as the stirring shaft 40 when the stirring shaft 40 rotates. In the present embodiment, the bearing 50 is the radial bearing. However, the bearing 50 may be another bearing, such as a thrust bearing. Moreover, the bearing 50 may have both the function of a radial bearing and the function of a thrust bearing.

The upper shoulder 10 includes an end surface 10a and a side peripheral surface 10b. The end surface 10a is a surface opposed to the intermediate shoulder 30. The side peripheral surface 10b is a side surface formed around the axis of the stirring shaft 40. A corner 10c between the end surface 10a and the side peripheral surface 10b in the upper shoulder 10 may be chamfered. Moreover, the lower shoulder 20 includes an end surface 20a and a side peripheral surface 20b. The end surface 20a is a surface opposed to the intermediate shoulder 30. The side peripheral surface 20b of the lower shoulder 20 is a side surface formed around the axis of the stirring shaft 40. A corner 20c between the end surface 20a and the side peripheral surface 20b in the lower shoulder 20 may be chamfered.

The intermediate shoulder 30 is configured such that a length thereof in a direction (joining direction D1) along joining lines at which plates of workpieces are joined to each other is larger than each of a length of the upper shoulder 10 in the above direction and a length of the lower shoulder 20 in the above direction. Moreover, the intermediate shoulder 30 is formed such that a length thereof in a direction (facing direction D2) in which the plates of the workpieces face each other when joining the plates of the workpieces is larger than each of a length of the upper shoulder 10 in the above direction and a length of the lower shoulder 20 in the above direction. In the present embodiment, especially, the intermediate shoulder 30 is configured such that the length thereof in the joining direction D1 is large and is formed such that the length thereof in the joining direction D1 is larger than the length thereof in the facing direction D2.

The intermediate shoulder 30 may be configured such that a section thereof along a direction intersecting with the joining direction has a substantially rectangular shape. The intermediate shoulder 30 includes, for example, an end surface 30a opposed to the upper shoulder 10, a side peripheral surface 30b, and an end surface 30c opposed to the lower shoulder 20. For example, in the intermediate shoulder 30, a radially outer portion of the end surface 30a opposed to the upper shoulder 10 is inclined so as to be away from the upper shoulder as the radially outer portion of the end surface 30a extends toward the side peripheral surface 30b. Moreover, for example, in the intermediate shoulder 30, a radially outer portion of the end surface 30c opposed to the lower shoulder 20 is inclined so as to be away from the lower shoulder 20 as the radially outer portion of the end surface 30c extends toward the side peripheral surface 30b. Furthermore, the intermediate shoulder 30 includes an intermediate shoulder main body portion 29.

The intermediate shoulder 30 includes supporting members 32 (FIG. 2). The supporting members 32 are attached to the intermediate shoulder main body portion 29. The supporting members 32 are attached to the side peripheral surface 30b of the intermediate shoulder 30. In the present embodiment, the supporting members 32 are attached to portions of the side peripheral surface 30b which portions are located outside in the joining direction D1 in the intermediate shoulder 30. Wheels (rolling portions) 31 are rotatably attached to each of the two supporting members 32. For example, a shaft extending in the facing direction D2 is attached at a center of each wheel 31. The wheel 31 is, for example, supported by the supporting member 32 so as to be rotatable about the shaft. Therefore, the wheels 31 roll in the joining direction D1. In the present embodiment, for example, the wheels 31 are cylindrical rollers. Since each wheel 31 is constituted by the cylindrical roller, a region where the wheel 31 contacts the workpiece has a line shape extending in the facing direction D2. Therefore, the wheel 31 rolls while being in line-contact with the workpiece. Thus, the wheels 31 can stably roll on the workpieces in the joining direction D1, and the intermediate shoulder 30 can move stably. In the present embodiment, for example, the wheels 31 arranged at two positions along the joining direction D1 are arranged symmetrically across a center position of the intermediate shoulder 30. Moreover, for example, the wheels 31 arranged at two positions along the facing direction D2 in the intermediate shoulder 30 are arranged symmetrically across the center position of the intermediate shoulder 30.

Moreover, the intermediate shoulder 30 includes whirl-stop portions 33 configured to contact the workpieces to perform whirl-stop. Each of the whirl-stop portions 33 is attached to an upper portion of the supporting member 32 of the intermediate shoulder 30. The whirl-stop portion 33 is attached at a position above the wheel 31. In the present embodiment, the whirl-stop portions 33 are attached to both end portions of each supporting member 32 which portions are located outside in the facing direction D2. Two whirl-stop portions 33 are attached to each supporting member 32, and therefore, four whirl-stop portions 33 are attached to the intermediate shoulder 30. The whirl-stop portions 33 are attached to both end portions of the intermediate shoulder 30 which portions are located in the facing direction in which the workpieces face each other. The whirl-stop portions 33 may be constituted by, for example, cylindrical rollers. Moreover, for example, each cylindrical roller is attached so as to be rotatable about a rotating shaft 34.

A gap (first gap portion) x1 is formed between the upper shoulder 10 and the intermediate shoulder 30. A gap (second gap portion) x2 is formed between the lower shoulder and the intermediate shoulder.

The workpieces are joined to each other by friction stir welding at two facing positions that are upper and lower positions. In the present embodiment, each of the workpieces to be joined to each other is constituted as a so-called double skin member formed such that two plates w1 and w2 that are upper and lower plates are connected to each other by a beam member w3.

The friction stir welding is performed by using the friction stir welding tool 100 configured as above. When performing the friction stir welding, a facing portion (first facing portion) w4 constituted by making end portions of the workpieces face each other is inserted into the gap x1 between the upper shoulder 10 and the intermediate shoulder 30. In addition, a facing portion (second facing portions) w5 constituted by making end portions of the workpieces face each other is inserted into the gap x2 between the intermediate shoulder 30 and the lower shoulder 20. To be specific, the facing portions w4 and w5 of the workpieces are respectively inserted into the gap x1 between the upper shoulder 10 and the intermediate shoulder 30 and the gap x2 between the intermediate shoulder 30 and the lower shoulder 20.

Figure 4:
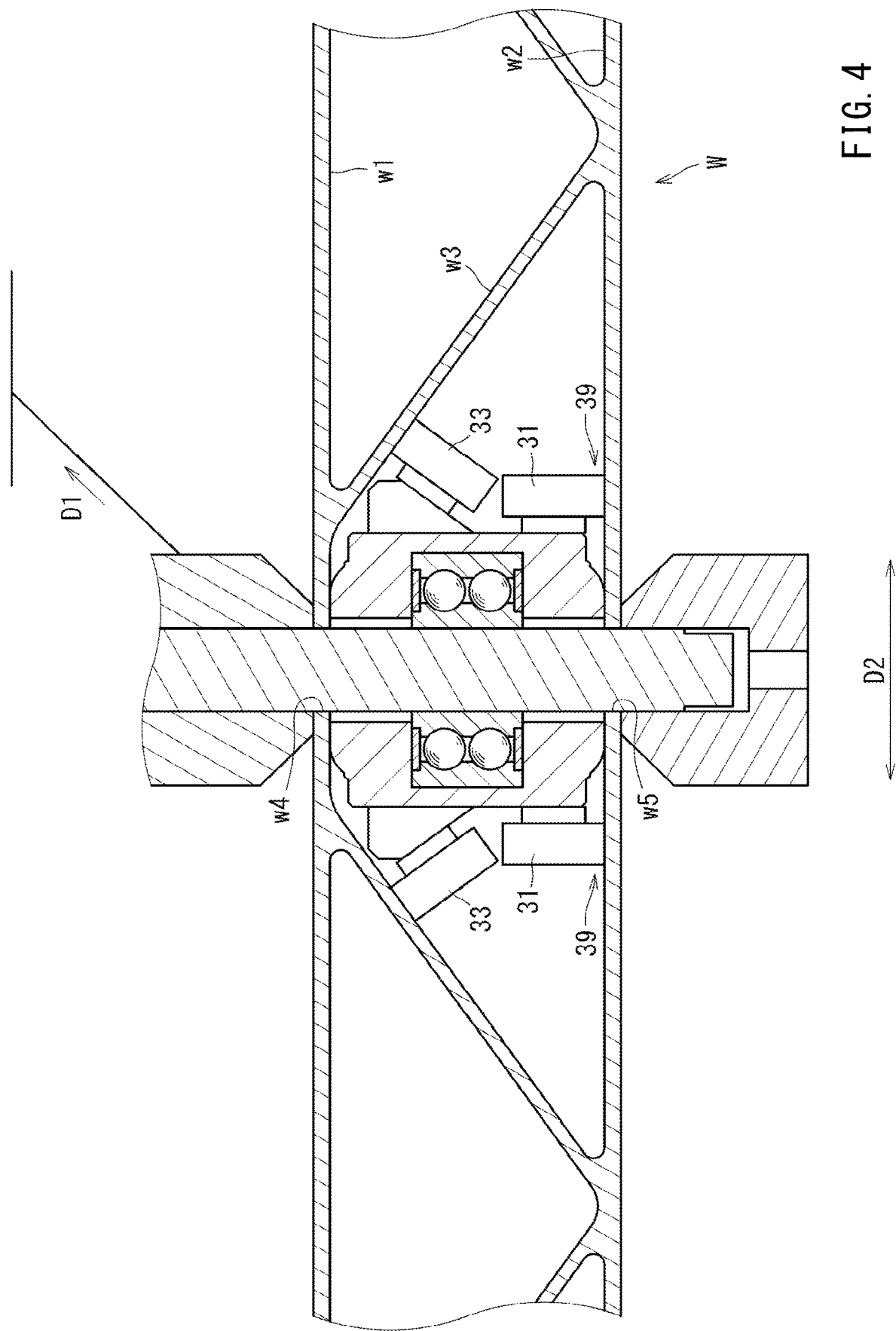
FIG. 4 is a perspective view showing a partial section of the friction stir welding tool of FIGS. 1A and 1B and partial sections of workpieces when friction stir welding is performed by using the friction stir welding tool.

FIG. 4 is a perspective view showing partial sections of workpieces W and the friction stir welding tool 100 in a state where the facing portions w4 and w5 of the workpieces are respectively arranged in the gap x1 between the upper shoulder 10 and the intermediate shoulder 30 and the gap x2 between the intermediate shoulder 30 and the lower shoulder 20.

As shown in FIG. 4, the friction stir welding is performed along the joining direction D1. When performing the friction stir welding along the joining direction D1, the friction stir welding tool moves along the joining direction D1 while the wheels 31 roll along the joining direction D1. Since the friction stir welding tool 100 moves in the joining direction D1 while the wheels 31 roll, friction generated between the intermediate shoulder 30 and the workpieces W when the friction stir welding tool 100 moves can be reduced.

At this time, the friction stir welding is performed in a state where the whirl-stop portions 33 are in contact with the workpieces W. The whirl-stop portions 33 are rotatable about the corresponding rotating shafts 34 while being in contact with the workpieces W. Therefore, when the friction stir welding tool moves along the joining direction D1 in order to perform the friction stir welding, contact states between the whirl-stop portions 33 and the workpieces W are maintained while the whirl-stop portions 33 roll along the joining direction D1.

Since the friction stir welding is performed in such a manner that the friction stir welding tool 100 moves in the joining direction D1 while the whirl-stop portions 33 roll along the joining direction D1, friction between the whirl-stop portions 33 and the workpieces W is reduced. Therefore, while the friction stir welding tool 100 smoothly moves, the contact states between the whirl-stop portions 33 and the workpieces W are maintained.

In the present embodiment, the friction stir welding tool 100 is configured such that when the friction stir welding tool and the workpieces W are set, the intermediate shoulder 30 is sandwiched by the beam members w3 of the workpieces W and contacts both of the beam members w3. Moreover, the intermediate shoulder 30 is configured such that the whirl-stop portions 33 contact the beam members w3 of the the workpieces W.

Before performing the friction stir welding, the plates w1 are sandwiched by the gap x1 between the upper shoulder 10 and the intermediate shoulder 30, and the plates w2 are sandwiched by the gap x2 between the intermediate shoulder 30 and the lower shoulder 20 in the friction stir welding tool. In the present embodiment, the friction stir welding tool 100 is arranged such that: the plates w1 are sandwiched by the gap x1; the plates w2 are sandwiched by the gap x2; and the whirl-stop portions 33 of the intermediate shoulder 30 are brought into contact with the beam members w3. The friction stir welding is performed in a state where the whirl-stop portions 33 are in contact with the workpieces W. Therefore, when performing the friction stir welding, the intermediate shoulder 30 is supported by the workpieces W. On this account, it is possible to prevent a case where when the stirring shaft 40 rotates in order to perform the friction stir welding, the intermediate shoulder 30 rotates together with the rotation of the stirring shaft 40. To be specific, the whirl-stop portions 33 perform whirl-stop such that even when the stirring shaft 40 rotates, the intermediate shoulder 30 does not rotate by the rotation of the stirring shaft 40. In the present embodiment, the whirl-stop portions 33 contacts the workpieces W at both outer sides in the facing direction D2. Therefore, when the stirring shaft 40 rotates, the whirl-stop portions 33 perform the whirl-stop at both outer sides in the facing direction D2 such that the intermediate shoulder 30 does not rotate.

When performing the friction stir welding, the stirring shaft 40 rotates about its axis, and the friction stir welding tool 100 moves in a direction which intersects with an axial direction of the stirring shaft 40 and extends along a joining line of the facing portion w4 and a joining line of the facing portion w5. When the friction stir welding tool 100 moves, the upper shoulder 10 rotates by the rotation of the stirring shaft 40, and the upper shoulder 10 and the facing portion w4 of the plates w1 arranged between the upper shoulder 10 and the intermediate shoulder 30 contact each other. At this time, the intermediate shoulder 30 and the facing portion w4 of the plates w1 contact each other at a position of a back side of a contact portion where the upper shoulder 10 and the facing portion w4 of the plates w1 contact each other.

Since the rotating upper shoulder 10 and the facing portion w4 of the plates w1 contact each other while being supported by the intermediate shoulder 30, frictional heat is generated between the upper shoulder 10 and the facing portion w4. This frictional heat causes plastic flow and softening of portions of the plates w1 which portions are to be joined to each other. In a state where the portions of the plates w1 which portions are to be joined to each other are softened, the stirring shaft 40 stirs the portions. With this, the facing portion w4 of the plates w1 is stirred and joined. Thus, the friction stir welding of the facing portion of the plates w1 is performed.

Moreover, when the friction stir welding tool 100 moves in the joining direction, the lower shoulder 20 rotates by the rotation of the stirring shaft 40, and the facing portion w5 of the plates w2 and the lower shoulder 20 contact each other. At this time, the facing portion w5 and the intermediate shoulder 30 contact each other at a position of a back side of a contact portion where the facing portion w5 of the plates w2 and the lower shoulder 20 contact each other.

The friction stir welding is performed at the gap x2 between the intermediate shoulder 30 and the lower shoulder 20 as with at the gap x1 between the upper shoulder 10 and the intermediate shoulder 30. In a state where upper sides of the plates w2 are supported by the intermediate shoulder 30, the rotating lower shoulder 20 and the facing end portions of the plates w2 contact each other. Therefore, frictional heat is generated between the lower shoulder 20 and the facing portion w5 of the plates w2. This frictional heat causes the plastic flow and softening of portions of the plates w2 which portions are to be joined to each other. In a state where the portions of the plates w2 which portions are to be joined to each other are softened, the stirring shaft 40 stirs the portions. With this, the facing portion w5 of the plates w2 is stirred and joined. Thus, the friction stir welding of the facing portion w5 of the plates w2 is performed.

As above, the friction stir welding is performed in such a manner that: the facing portions w4 and w5 of the plates w1 and w2 are made to flow by the frictional heat; and the stirring shaft 40 stirs the flowing portions of the facing portions w4 and w5 of the plates w1 and w2. In the present embodiment, the friction stir welding is performed simultaneously at both the upper gap portion x1 between the upper shoulder 10 and the intermediate shoulder 30 and the lower gap portion x2 between the intermediate shoulder 30 and the lower shoulder 20. Therefore, the two facing portions of the workpieces W can be joined by performing the friction stir welding once. With this, the workpieces W can be efficiently joined to each other.

Moreover, in the present embodiment, the intermediate shoulder 30 is configured to be rotatable relative to the stirring shaft 40. Therefore, the friction stir welding can be performed in such a manner that when the stirring shaft 40 rotates about its axis, the upper shoulder 10 and the lower shoulder 20 rotates by the rotation of the stirring shaft 40, but the intermediate shoulder 30 does not rotate by the rotation of the stirring shaft 40. Therefore, the generation of the heat at the portions to be joined to each other can be made small.

If the intermediate shoulder 30 also rotates by the rotation of the stirring shaft 40 about its axis together with the upper shoulder 10 and the lower shoulder 20, a relatively large amount of heat is generated between the friction stir welding tool and the workpieces W during the friction stir welding. When a large amount of frictional heat is generated, the workpieces W easily flow by the heat, and therefore, the friction stir welding is performed in a state where the workpieces W are soft. Therefore, burrs tend to be generated.

However, in the present embodiment, when performing the friction stir welding, the amount of heat generated can be made small. Therefore, the friction stir welding is performed in a state where the workpieces W are relatively hard. Thus, the generation of the burrs on the surfaces of the workpieces W can be made small. With this, the appearance of the workpieces W after the friction stir welding can be made satisfactory, and the design of the workpieces W can be improved.

Moreover, if there are the burrs on the surfaces of the workpieces W when inserting a wire or the like into an inside of the workpieces W, the burrs may contact the wire and interfere with the arrangement of the wire. In the present embodiment, since the generation of the burrs of the workpieces W can be made small, the wire or the like is arranged inside the workpieces W without being interfered by the burrs. Therefore, the quality of the workpieces W can be improved.

Moreover, when the burrs are generated at the workpiece W and come off inside the workpieces W, the burrs move inside the workpieces W and may contact the wire or the like. In the present embodiment, since the generation of the burrs is suppressed, the burrs can be prevented from coming off inside the workpieces W. Therefore, the quality of the workpieces W can be improved.

Moreover, when the burrs are generated at the workpieces W by the friction stir welding, and such workpieces W are provided as structures, stress concentration may occur at the burrs, and this may influence the durability of the workpieces W. In the present embodiment, since the generation of the burrs can be made small, the durability of the joined portions of the workpieces W can be improved.

Moreover, in the present embodiment, for example, the four wheels 31 are rotatably attached to the supporting members 32 at positions outside friction stir welding regions R1 and R2 in the joining direction D1 in the intermediate shoulder 30. Therefore, the wheels 31 contact the workpieces W at positions outside the friction stir welding regions R1 and R2 in the joining direction D1 in the intermediate shoulder 30. The friction stir welding regions R1 and R2 are plane regions which contribute to the friction stir welding in the friction stir welding tool 100. Moreover, in the illustrated example, the wheels 31 are attached at positions outside the upper shoulder 10 and the lower shoulder 20 in the joining direction D1.

Contact portions (inclination preventing portions) 39 of the intermediate shoulder 30 are portions which contact the workpieces W at positions outside the friction stir welding region R1, where the friction stir welding is performed at the upper gap x1, and the friction stir welding region R2, where the friction stir welding is performed at the lower gap portion x2, in the the joining direction D1. In the present embodiment, the contact portions 39 are the wheels 31.

Figure 5:
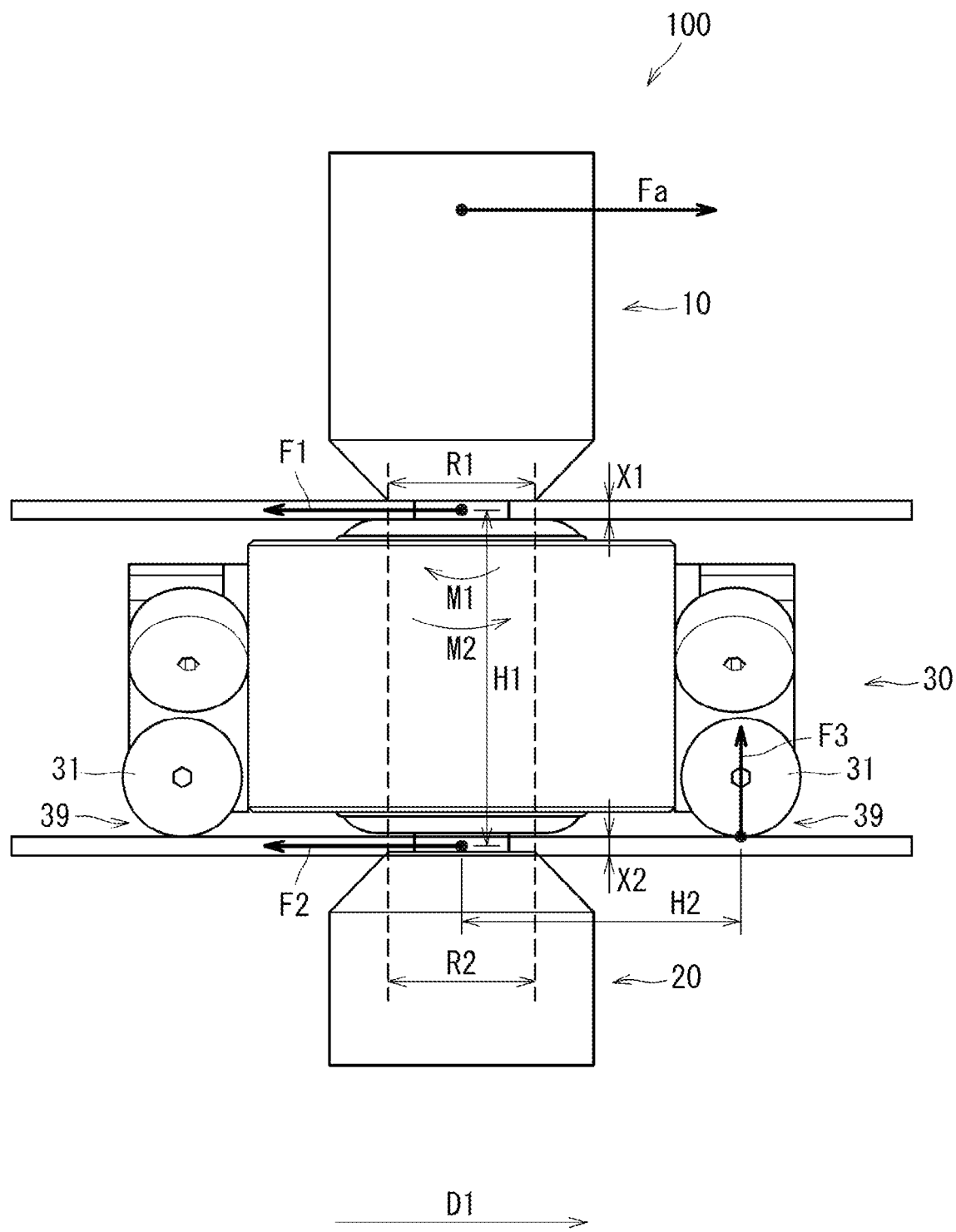
FIG. 5 is an explanatory diagram for explaining reaction force and rotational moments which act on the friction stir welding tool of FIGS. 1A and 1B when the friction stir welding is performed by using the friction stir welding tool.

FIG. 5 is a side view showing the friction stir welding tool during the friction stir welding. When the friction stir welding tool 100 moves in the joining direction D1 to perform the friction stir welding, reaction force acts on the friction stir welding tool 100 in a direction opposite to the joining direction D1 of the friction stir welding tool 100. Moreover, the friction stir welding tool 100 is held by an apparatus main body at a position of an upper portion thereof. When the friction stir welding is performed by the friction stir welding tool 100 in this state, force Fa which moves the friction stir welding tool 100 acts on a portion of the friction stir welding tool 100 which portion is held by the apparatus main body.

In the present embodiment, the friction stir welding is performed in both of the friction stir welding region R1 and the friction stir welding region R2. Therefore, the reaction force which acts on the friction stir welding tool 100 from the workpieces W act in each of the friction stir welding region R1 and the friction stir welding region R2.

As shown in FIG. 5, the reaction force acting in the friction stir welding region R1 of the upper gap x1 is represented by F1, and the reaction force acting in the friction stir welding region R2 of the lower gap x2 is represented by F2. Moreover, a rotational moment acting at a position of the upper gap x1 by the reaction force F2 at a rotation axis of the stirring shaft is represented by M1. Furthermore, a distance between the upper gap x1 and the lower gap x2 is represented by H1. The rotational moment M1 is represented by a product of the reaction force F2 and the distance H1. The rotational moment M1 acts in such a direction that the stirring shaft 40 is inclined by moving a lower portion of the stirring shaft 40 in a direction opposite to the joining direction D1.

The wheels 31 of the intermediate shoulder 30 contact lower portions of the workpieces W. Therefore, the friction stir welding tool 100 receives the reaction force from the workpiece W at portions where the wheels 31 contact the workpieces W. Reaction force received from the workpiece W by the wheel 31 arranged at a front side in the joining direction D1 is represented by F3. Moreover, a rotational moment acting on the rotation axis of the stirring shaft by the reaction force F3 is represented by M2. Furthermore, a distance between the rotation axis of the stirring shaft and the wheel 31 is represented by H2. The rotational moment M2 is represented by a product of the reaction force F3 and the distance H2.

When the rotational moment M1 acts on the stirring shaft 40 at the position of the upper gap x1 by the reaction force F2 acting on the friction stir welding tool 100 during the friction stir welding, the stirring shaft 40 is inclined in a front-rear direction along the joining direction D1. Specifically, the stirring shaft 40 is inclined such that: a front portion of the intermediate shoulder 30 in the joining direction D1 moves downward; and a rear portion of the intermediate shoulder 30 in the joining direction D1 moves upward.

At this time, at a front side in the joining direction D1, the wheels 31 contact the workpieces W in regions outside the friction stir welding regions R1 and R2 in the joining direction D1. When the stirring shaft 40 is about to be inclined by the rotational moment M1, the reaction force F3 from the workpieces W at the positions of the wheels 31 at the front portion, which moves downward, in the joining direction D1 increases. At this time, as the reaction force F3 increases, the rotational moment M2 generated by the reaction force F3 also increases. Therefore, the rotational moment M1 which inclines the stirring shaft 40 is canceled by the rotational moment M2 generated by the reaction force F3, and thus, the magnitude of the rotational moment which inclines the stirring shaft 40 can be suppressed.

Moreover, two wheels 31 are arranged at each of front and rear positions of the intermediate shoulder 30 in the joining direction D1 so as to be lined up in the facing direction D2. Therefore, the reaction force F3 from the workpieces W acts on the intermediate shoulder 30 at two positions lined up in the facing direction D2. On this account, the reaction force F3 acts uniformly in the facing direction D2. Moreover, the rotational moment M2 generated by the reaction force F3 also acts uniformly in the facing direction D2. Therefore, the reaction force F3 and the rotational moment M2 acting on the intermediate shoulder 30 can be balanced in the facing direction D2. On this account, the intermediate shoulder 30 is more stably arranged on the workpieces W in the facing direction D2.

Moreover, for example, when the movement of the friction stir welding tool 100 for the friction stir welding is reversed, i.e., the joining direction becomes a direction opposite to the direction D1 shown in FIG. 5, a direction in which the stirring shaft 40 is about to be inclined becomes a direction opposite to the direction when the joining direction is the direction D1. The stirring shaft 40 is inclined such that: the front portion of the friction stir welding tool 100 in the movement direction moves downward; and the rear portion of the friction stir welding tool 100 in the movement direction moves upward. In this case, when the stirring shaft 40 is about to be inclined, the reaction force from the workpieces W increases at the positions of the wheels 31 located at a front side in the movement direction of the friction stir welding tool 100. At this time, as the reaction force from the workpieces W increases, the rotational moment (which acts in a direction opposite to the direction in which the rotational moment M2 acts) generated by the reaction force from the workpieces W also increases. Therefore, the rotational moment which inclines the stirring shaft 40 is canceled by the rotational moment generated by the reaction force from the workpieces W, and thus, the magnitude of the rotational moment which inclines the stirring shaft 40 can be suppressed.

As above, since parts of the intermediate shoulder 30 and the workpieces W contact each other at positions outside the intermediate shoulder 30 in the joining direction D1, the rotational moments which incline the stirring shaft 40 in the friction stir welding regions R1 and R2 can be canceled. Therefore, the inclination of the stirring shaft 40 can be suppressed. With this, the bending of the stirring shaft 40 can be suppressed. Since the bending of the stirring shaft 40 can be suppressed, the durability of the friction stir welding tool 100 can be improved.

Moreover, the rotational moments which incline the stirring shaft 40 are canceled. Therefore, even when a load acting on the friction stir welding tool 100 is increased, the friction stir welding tool 100 can be prevented from being influenced in terms of strength. Therefore, a movement speed in the joining direction D1 when performing the friction stir welding can be made high. Since the movement speed during the friction stir welding can be made high, the friction stir welding can be more efficiently performed.

Moreover, in the present embodiment, the wheels 31 contact the workpiece W, arranged at the lower gap x2, at positions outside the friction stir welding region R1 and the friction stir welding region R2 in a radial direction of the stirring shaft 40. The intermediate shoulder 30 contacts the workpieces W in regions outside the friction stir welding regions R1 and R2. Therefore, when the friction stir welding tool 100 moves along the joining direction D1, the intermediate shoulder 30 is arranged on the workpieces W while being stably supported in the joining direction D1.

Therefore, in a state where the rotation axis of the stirring shaft 40 is stabilized, the friction stir welding tool 100 moves, and the stirring shaft 40 can be prevented from being inclined and bent. With this, the durability of the friction stir welding tool 100 can be improved.

Moreover, two wheels 31 are arranged at each of front and rear positions of the intermediate shoulder 30 in the joining direction D1 so as to be lined up in the facing direction D2. Therefore, the intermediate shoulder 30 contacts the workpieces W in regions outside the friction stir welding regions R1 and R2 in the facing direction D2. Therefore, when the friction stir welding tool 100 moves along the joining direction D1, the intermediate shoulder 30 is arranged on the workpieces W while being stabilized in the facing direction D2. On this account, the bending of the stirring shaft 40 can be suppressed in the facing direction D2.

Moreover, in the present embodiment, the wheels 31 contact the workpieces W in regions outside the friction stir welding regions R1 and R2 in the facing direction D2. To be specific, the intermediate shoulder 30 contacts the workpieces W in regions outside the friction stir welding regions R1 and R2 in the facing direction D2. Since the intermediate shoulder 30 contacts the workpieces W in regions outside the friction stir welding regions R1 and R2 in the facing direction D2, the stirring shaft 40 can be prevented from being inclined and bent in the facing direction D2. With this, the durability of the friction stir welding tool 100 can be further improved.

Moreover, in the present embodiment, while the wheels 31 roll in the joining direction D1, the friction stir welding tool 100 moves in the joining direction D1. Therefore, the wheels 31 are configured as contact portions (second shoulder portion-side contact portions) which contact the workpieces W at a lower portion (second contact portion side) of the intermediate shoulder 30. Since the intermediate shoulder 30 moves in the joining direction D1 while the wheels 31 roll, friction generated between the intermediate shoulder 30 and the workpiece W can be made small. On this account, the intermediate shoulder 30 can be made to move smoothly in the joining direction D1.

Moreover, in the present embodiment, in a state where the workpieces W are supported by the intermediate shoulder 30 which does not rotate by the rotation of the stirring shaft 40, the upper shoulder 10 and the lower shoulder 20 rotate by the rotation of the stirring shaft 40. The friction stir welding is performed in a state where the workpieces W are supported by the intermediate shoulder 30. Therefore, even when the strength of the workpieces W is low, the friction stir welding can be smoothly performed. On this account, for example, when the plates w1 and w2 of the workpieces W are thin, the friction stir welding can be performed satisfactorily. Thus, ranges of the workpieces W to which ranges the friction stir welding is applied can be made large.

The present embodiment has described a case where the wheels 31 that are cylindrical rollers roll, and with this, the intermediate shoulder 30 moves along the joining direction in which the friction stir welding is performed. However, the present invention is not limited to the above embodiment. For example, in the intermediate shoulder 30, the contact portions 39 which contact the workpieces W may be spherical balls which roll in the joining direction. When performing the friction stir welding, the intermediate shoulder 30 may move along the joining direction D1 while the balls roll.

Moreover, a low friction material which reduces friction between the intermediate shoulder 30 and the workpieces W may be provided at portions of the intermediate shoulder 30 which portions are located close to the lower shoulder and contact the workpieces W. As the low friction material, DLC (diamond-like carbon) may be used. When the portions of the intermediate shoulder 30 which portions are located close to the lower shoulder and contact the workpieces W are coated with the DLC, friction coefficients of the portions of the intermediate shoulder 30 which portions are located close to the lower shoulder and contact the workpieces W can be made made small. Therefore, when the friction stir welding tool 100 is made to move in the joining direction D1 in order to perform the friction stir welding, the intermediate shoulder 30 can be made to slide smoothly relative to the workpieces W, and resistance generated when the friction stir welding tool 100 moves can be made small. In this case, in the intermediate shoulder 30, the contact portions 39 which contact the workpieces W may be the intermediate shoulder main body portion 29. It should be noted that another low friction material may be used as long as friction between the intermediate shoulder 30 and the workpieces W can be reduced.

Moreover, the present embodiment has described a case where the whirl-stop portion 33 that is a cylindrical roller contacts the workpiece W to perform the whirl-stop of the intermediate shoulder 30. However, the present invention is not limited to the above embodiment. For example, a whirl-stop portion formed in a ball shape may contact the workpiece W to perform the whirl-stop of the intermediate shoulder 30. The whirl-stop portion 33 may have a shape other than a roller as long as the whirl-stop portion 33 can contact the workpiece W to perform the whirl-stop. As long as the whirl-stop portion 33 has such a shape as to be able to roll along the joining direction D1, friction generated between the whirl-stop portion 33 and the workpiece W when the friction stir welding tool 100 moves along the joining direction D1 can be suppressed, which is preferable.

Figure 6:
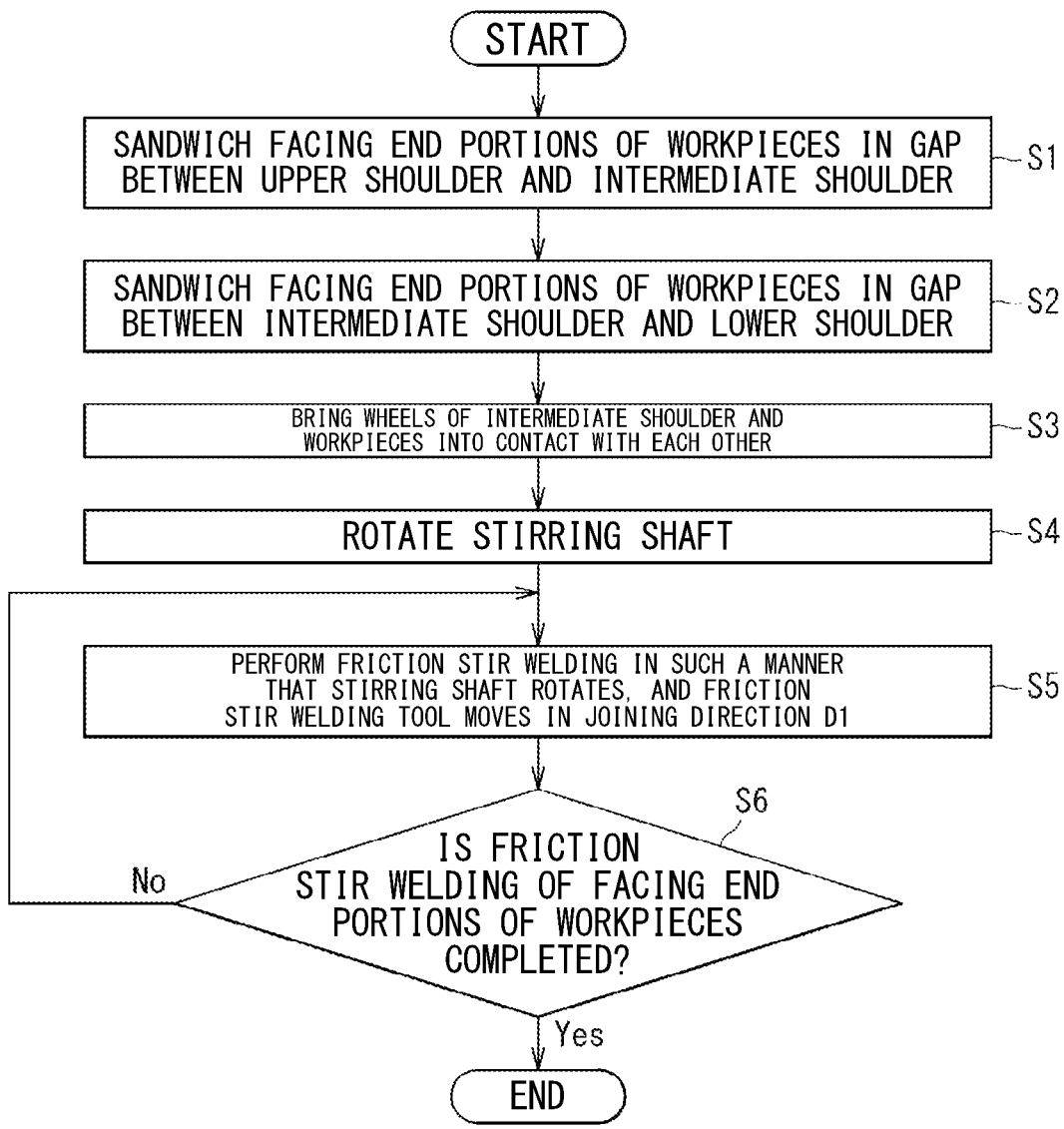
FIG. 6 is a flowchart showing steps when the friction stir welding is performed by using the friction stir welding tool shown in FIGS. 1A and 1B.

FIG. 6 is a flowchart showing steps when the friction stir welding method according to the present embodiment is performed. When performing the friction stir welding, first, the friction stir welding tool 100 and the workpieces W are set. In the present embodiment, the facing portion w4 (FIG. 4) constituted by making the end portions of the plates, which are joined to each other, of the workpieces W face each other is sandwiched by and inserted into the gap x1 between the upper shoulder 10 and the intermediate shoulder 30 (first sandwiching step; S1). Moreover, the facing portion w5 (FIG. 4) constituted by making the end portions of the plates, which are joined to each other, of the workpieces W face each other is sandwiched by and inserted into the gap x2 between the intermediate shoulder 30 and the lower shoulder 20 (second sandwiching step; S2). When respectively setting the facing portions w4 and w5, each of which is constituted by making the end portions of the workpieces W face each other, in the gaps x1 and x2 in the friction stir welding tool 100, the workpieces W are set such that parts of the intermediate shoulder 30 contact the workpieces W. In the present embodiment, the wheels 31 attached to the intermediate shoulder 30 and the workpieces W contact each other at positions outside the friction stir welding regions R1 and R2 of the gaps x1 and x2 of the friction stir welding tool 100 in the joining direction D1 (S3).

A step performed at first may be any of the step of sandwiching the facing portion w4, constituted by making the end portions of the workpieces W face each other, in the gap x1 between the upper shoulder 10 and the intermediate shoulder 30, the step of sandwiching the facing portion w5, constituted by making the end portions of the workpieces W face each other, in the gap x2 between the intermediate shoulder 30 and the lower shoulder 20, and the step of bringing the wheels 31 attached to the intermediate shoulder 30 and the workpieces W into contact with each other. Or, these steps may be performed simultaneously. To be specific, the order of these steps may be any order as long as the facing portion w4 of the workpieces W is arranged in the gap x1 between the upper shoulder 10 and the intermediate shoulder 30, the facing portion w5 of the workpieces W is arranged in the gap x2 between the intermediate shoulder 30 and the lower shoulder 20, and the wheels 31 attached to the intermediate shoulder 30 and the workpieces are brought into contact with each other.

After the friction stir welding tool 100 and the workpieces W are set, the stirring shaft 40 is rotated (S4). Then, the friction stir welding is performed in such a manner that: in a state where the stirring shaft 40 is rotating, the stirring shaft 40 is brought into contact with the workpieces W; and the friction stir welding tool 100 moves in the joining direction D1 (S5). When the stirring shaft and the workpieces W are brought into contact with each other in a state where the stirring shaft 40 is rotating, frictional heat is generated at portions where the stirring shaft 40 and the workpieces W contact each other. This frictional heat causes the plastic flow and softening of portions of the plates of the workpieces W which portions are to be joined to each other. At this time, the friction stir welding is performed while preventing the stirring shaft 40 from being inclined (friction stir welding step).

The friction stir welding is performed until the friction stir welding of the entire facing end portions of the workpieces W terminates (S6). After the friction stir welding of the entire facing portions w4 and w5 of the workpieces W is completed, the friction stir welding terminates.

The present embodiment has described a case where since the intermediate shoulder 30 contacts the workpieces W at positions outside the friction stir welding regions R1 and R2 of the gaps x1 and x2 of the friction stir welding tool 100 in the facing direction D2, the inclination of the stirring shaft 40 in the joining direction D2 can be suppressed. However, the present invention is not limited to the above embodiment. For example, the intermediate shoulder 30 may contact the workpieces W at positions outside the friction stir welding regions R1 and R2 in the joining direction D1 and inside the friction stir welding regions R1 and R2 in the facing direction D2. Even when the intermediate shoulder 30 contacts the workpieces W at positions inside the friction stir welding regions R1 and R2 in the facing direction D2, the bending of the stirring shaft 40 can be suppressed as long as the intermediate shoulder 30 contacts the workpieces W at positions outside the friction stir welding regions R1 and R2 in the joining direction D1.

Moreover, the above embodiment has described a case where the wheels 31 are provided only at the lower portion of the intermediate shoulder 30. However, the present invention is not limited to the above embodiment. The wheels 31 may be provided at not only the lower portion of the intermediate shoulder 30 but also the upper portion (first contact portion) of the intermediate shoulder 30. To be specific, the intermediate shoulder 30 may include not only contact portions 39a configured to contact the workpieces W at the lower portion but also contact portions (first shoulder portion-side contact portions) 39b configured to contact the workpieces W at the upper portion (first shoulder portion side). As above, the intermediate shoulder 30 may contact the workpieces W by both the contact portions 39b at the upper portion and the contact portions 39a at the lower portion.

Figure 7:
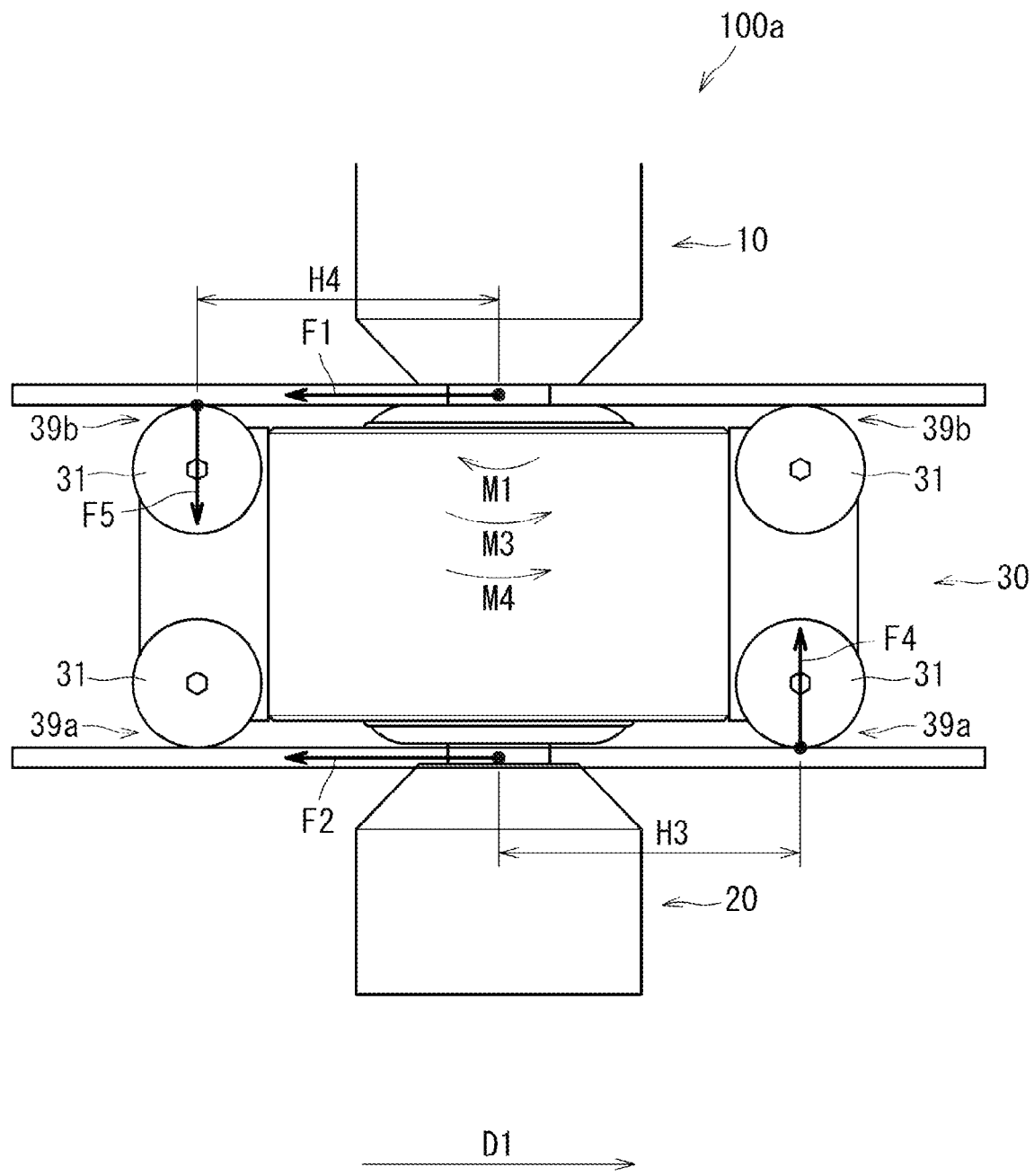
FIG. 7 is a side view showing a friction stir welding tool as a modified example of the friction stir welding tool shown in FIGS. 1A and 1B.

FIG. 7 is a side view showing a friction stir welding tool 100a configured such that the wheels 31 are the contact portions 39b configured to contact the workpieces W at the upper shoulder side of the intermediate shoulder 30 and the contact portions 39a configured to contact the workpieces W at the lower shoulder side of the intermediate shoulder 30. The wheels 31 are provided at the intermediate shoulder 30 so as to be located positions close to the upper shoulder and positions close to the lower shoulder in the axial direction of the stirring shaft 40. The wheels 31 are provided at front and rear sides in the joining direction D1 at the above positions. Moreover, two wheels 31 are provided along the facing direction D2 at each of the above positions.

As above, the wheels 31 may be provided at the intermediate shoulder 30 so as to be located at the positions close to the upper shoulder and the positions close to the lower shoulder. With this, the friction can be reduced at the positions close to the lower shoulder in the intermediate shoulder 30, and in addition, the friction can be reduced at the positions close to the upper shoulder in the intermediate shoulder 30. With this, the intermediate shoulder 30 can be made to move more smoothly along the joining direction D1.

Moreover, at the upper shoulder side of the intermediate shoulder 30, the wheels 31 and the workpieces W are brought into contact with each other at positions outside the friction stir welding regions R1 and R2. Therefore, since the intermediate shoulder 30 is supported by the workpieces W at the upper side, the intermediate shoulder 30 contacts larger regions of the workpieces W. With this, when the friction stir welding tool 100a moves along the joining direction D1, the intermediate shoulder 30 is further stably arranged on the workpieces W in the joining direction D1.

Moreover, two wheels 31 lined up in the facing direction D2 are arranged at each of positions away from each other in the joining direction D1 of the intermediate shoulder 30 and the axial direction of the stirring shaft 40. Therefore, the intermediate shoulder 30 contacts large regions of the workpieces W in the facing direction D2 at both the upper shoulder side and the lower shoulder side. On this account, when the friction stir welding tool 100 moves along the joining direction D1, the intermediate shoulder 30 is arranged on the workpieces W while being stabilized in the facing direction D2.

Moreover, since the wheels 31 contact the workpieces W at the upper shoulder side, the reaction force generated between the wheels 31 and the workpieces W can be received by the workpieces W at the upper shoulder side. Reaction force received from the workpiece by the wheel 31 arranged at a front side in the joining direction D1 out of the wheels 31 provided at the lower shoulder side of the intermediate shoulder 30 is represented by F4, and reaction force received from the workpiece W by the wheel 31 arranged at a rear side in the joining direction D1 out of the wheels 31 provided at the upper shoulder side of the intermediate shoulder 30 is represented by F5.

As described above by using FIG. 5, the reaction force acting in the friction stir welding region R1 of the upper gap x1 is represented by F1, and the reaction force acting in the friction stir welding region R2 of the lower gap x2 is represented by F2. Moreover, the rotational moment acting at the position of the upper gap x1 by the reaction force F2 at the rotation axis of the stirring shaft 40 is represented by M1. Furthermore, the rotational moment acting on the rotation axis of the stirring shaft by the reaction force F4 is represented by M3. A distance between the rotation axis of the stirring shaft and the wheel 31 located at a front side of the lower portion of the intermediate shoulder 30 is represented by H3. The rotational moment M3 is represented by a product of the reaction force F4 and the distance H3. Moreover, the rotational moment acting on the rotation axis of the stirring shaft by the reaction force F5 is represented by M4. A distance between the rotation axis of the stirring shaft and the wheel 31 located at a rear side of the upper portion of the intermediate shoulder 30 is represented by H4. The rotational moment M4 is represented by a product of the reaction force F5 and the distance H4.

As with the example shown in FIG. 5, when the rotational moment M1 acts on the stirring shaft 40 at the position of the upper gap x1 by the reaction force F2 acting on the friction stir welding tool 100 during the friction stir welding, the stirring shaft 40 is inclined. When the stirring shaft 40 is about to be inclined by the rotational moment M1, the reaction force F4 from the workpiece W at the position of the wheel 31 located at a front side of the lower portion of the intermediate shoulder 30 in the joining direction D1 increases. At this time, as the reaction force F4 increases, the rotational moment M3 generated by the reaction force F4 also increases. Moreover, when the stirring shaft 40 is about to be inclined by the rotational moment M1, the reaction force F5 from the workpiece W at the wheel 31 located at a rear side of the upper portion of the intermediate shoulder 30 in the joining direction D1 increases. At this time, as the reaction force F5 increases, the rotational moment M4 generated by the reaction force F5 also increases. Therefore, the rotational moment M1 which inclines the stirring shaft 40 is canceled by both of the rotational moment M3 generated by the reaction force F4 and the rotational moment M4 generated by the reaction force F5, and thus, the magnitude of the rotational moment which inclines the stirring shaft 40 can be further suppressed.

Moreover, two wheels 31 lined up in the facing direction D2 are arranged at each of positions away from each other in the joining direction D1 of the intermediate shoulder 30 and the axial direction of the stirring shaft 40. Therefore, the reaction force F4 from the workpieces W acts on the intermediate shoulder 30 at two portions lined up in the facing direction D2 of the workpieces W, and the reaction force F5 from the workpieces W acts on the intermediate shoulder 30 at two portions lined up in the facing direction D2 of the workpieces W. Therefore, each of the reaction force F4 and the reaction force F5 acts uniformly in the facing direction D2 of the workpieces W. Moreover, each of the rotational moment M3 generated by the reaction force F4 and the rotational moment M4 generated by the reaction force F5 also acts uniformly in the facing direction D2. Therefore, the reaction force F4, the reaction force F5, the rotational moment M3, and the rotational moment M4 acting on the intermediate shoulder 30 can be balanced in the facing direction D2. On this account, the intermediate shoulder 30 is arranged on the workpieces W while being further stabilized in the facing direction D2.

Moreover, for example, when the movement of the friction stir welding tool 100a for the friction stir welding is reversed, i.e., the joining direction becomes a direction opposite to the direction D1 shown in FIG. 7, a direction in which the stirring shaft 40 is about to be inclined becomes a direction opposite to the direction when the joining direction is the direction D1. The stirring shaft 40 is inclined such that: the front portion of the friction stir welding tool 100 in the movement direction moves downward; and the rear portion of the friction stir welding tool 100 in the movement direction moves upward. In this case, when the stirring shaft 40 is about to be inclined, the reaction force from the workpieces W increases at both of the upper and lower portions of the intermediate shoulder 30. At this time, as the reaction force from the workpieces W increases at both the upper and lower portions, the rotational moments (which act in directions opposite to the directions in which the rotational moments M3 and M4 act) generated by the reaction force from the workpieces W also increase. Therefore, the rotational moment which inclines the stirring shaft 40 is canceled by the two rotational moments generated by the reaction force from the workpieces W, and thus, the magnitude of the rotational moment which inclines the stirring shaft 40 can be further suppressed.

The present embodiment has described a case where the whirl-stop portions 33 are brought into contact with the workpieces W to serve as whirl stoppers for the intermediate shoulder 30. However, the present invention is not limited to the above embodiment. The rotation of the intermediate shoulder 30 may be suppressed in such a manner that part of the intermediate shoulder 30 contacts a portion other than the workpiece W. For example, the rotation of the intermediate shoulder 30 may be suppressed in such a manner that: a jig is arranged between the plates w1 and w2 of the workpiece W; and the intermediate shoulder 30 contacts the jig.

Moreover, the present embodiment has described a case where four or eight wheels 31 are attached to the intermediate shoulder 30. However, the present invention is not limited to the above embodiment. The number of wheels 31 may be different from the above. For example, the number of wheels 31 may be nine or more or three or less, such as two. The number of wheels 31 may be any number as long as the intermediate shoulder 30 smoothly moves in the joining direction D1 during the friction stir welding.

Moreover, a roller or a ball which reduces friction between the intermediate shoulder 30 and the workpiece W may be provided on the surface of the intermediate shoulder 30 so as to be located at positions outside the friction stir welding regions R1 and R2 of the intermediate shoulder 30 in the radial direction. Furthermore, a surface of a portion of the intermediate shoulder 30 which portion contacts the workpiece W may be coated with a low friction material. For example, coating using DLC may be performed. With this, when performing the friction stir welding, friction between the intermediate shoulder 30 and the workpiece W can be further reduced. Therefore, the friction stir welding can be performed smoothly.

Embodiment 2

Next, a friction stir welding tool 100b according to Embodiment 2 of the present invention will be described. It should be noted that explanations of the same components as Embodiment 1 are omitted, and only different components will be described.

Embodiment 2 is different from Embodiment 1 in that: an opposing portion (first opposing portion) 35a of the intermediate shoulder 30 which portion is opposed to the upper shoulder 10 through the upper gap x1 and an opposing portion (second opposing portion) 35b of the intermediate shoulder 30 which portion is opposed to the lower shoulder 20 through the lower gap x2 are configured to be movable relative to each other in the axial direction of the stirring shaft 40; and an elastic body is arranged between these opposing portions.

Figure 8A:
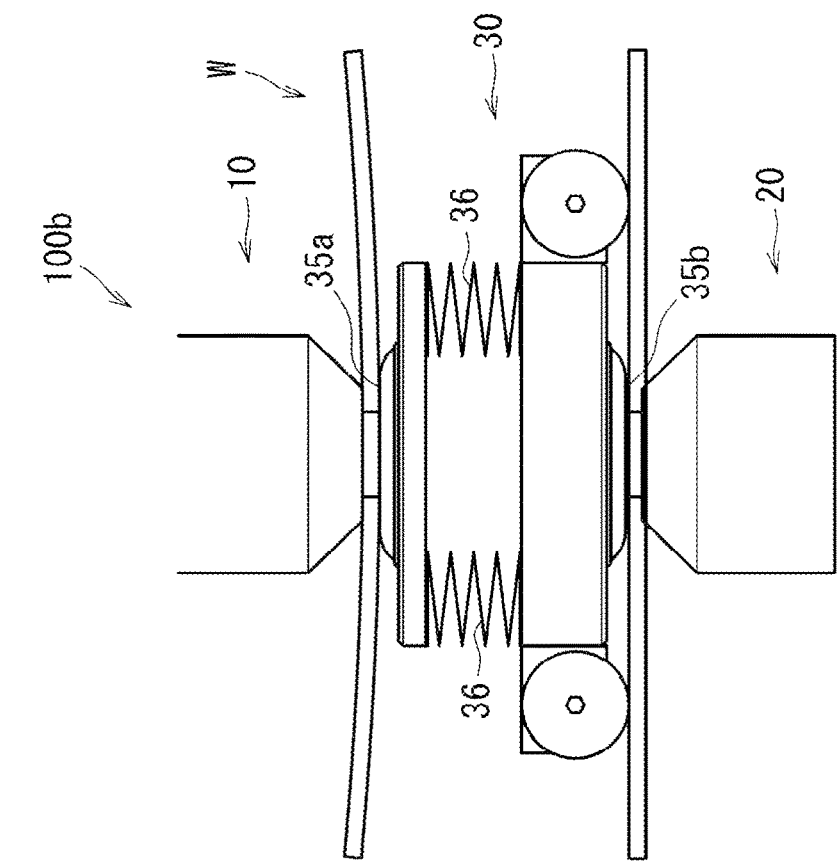
FIGS. 8A and 8B are side views showing a friction stir welding tool according to Embodiment 2 of the present invention.
Figure 8B:
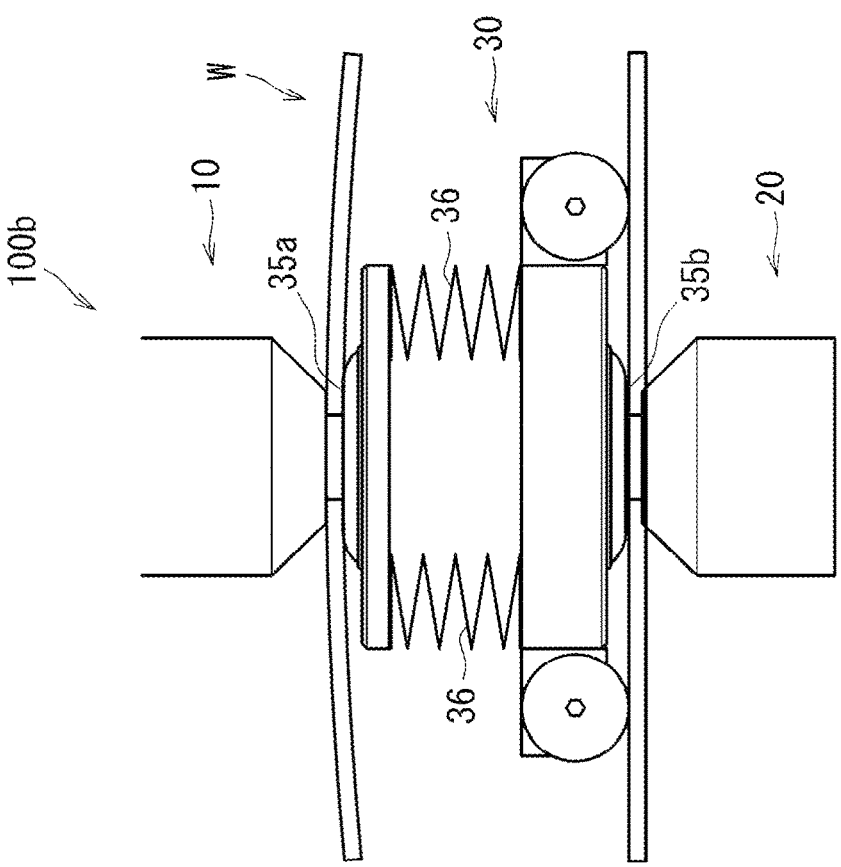

FIGS. 8A and 8B are side views showing the friction stir welding tool 100b of Embodiment 2. FIG. 8A is a side view showing the friction stir welding tool 100b in which the opposing portion 35a opposed to the upper shoulder 10 and the opposing portion 35b opposed to the lower shoulder 20 are located relatively away in distance from each other in the intermediate shoulder 30. Moreover, FIG. 8B is a side view showing the friction stir welding tool 100b in which the opposing portion 35a opposed to the upper shoulder 10 and the opposing portion 35b opposed to the lower shoulder 20 are located relatively close in distance to each other in the intermediate shoulder 30.

As shown in FIGS. 8A and 8B, the workpiece W may not have stable quality as a whole. The dimensional accuracy of such workpiece W may not be high depending on portions thereof. For example, the plate of such workpiece W may be configured to undulate or wave. In such a case, the intermediate shoulder 30 may contact a portion of the plate which portion is convex upward as shown in FIG. 8A, or the intermediate shoulder 30 may contact a portion of the plate which portion is convex downward as shown in FIG. 8B.

When the plate is formed so as to wave as above, a distance between a contact position where the intermediate shoulder 30 contacts the plate at the upper shoulder side and a contact position where the intermediate shoulder 30 contacts the plate at the lower shoulder side varies depending on positions along the joining direction D1. In such a case, if the distance between the contact position where the intermediate shoulder 30 contacts the plate at the upper shoulder side and the contact position where the intermediate shoulder 30 contacts the plate at the lower shoulder side is constant, the friction stir welding is performed with a gap between the intermediate shoulder 30 and the plate at a certain position in the joining direction D1, and therefore, the friction stir welding may not be performed accurately.

The friction stir welding tool 100b of the present embodiment is configured such that the opposing portion 35a of the intermediate shoulder 30 which portion is opposed to the upper shoulder 10 through the upper gap x1 and the opposing portion 35b of the intermediate shoulder 30 which portion is opposed to the lower shoulder 20 through the lower gap x2 are movable relative to each other in the axial direction of the stirring shaft 40. Moreover, the elastic body is arranged at a position between the opposing portion 35a of the intermediate shoulder 30 which portion is opposed to the upper shoulder 10 and the opposing portion 35b of the intermediate shoulder 30 which portion is opposed to the lower shoulder 20. In the present embodiment, for example, a spring 36 is provided as the elastic body.

Since the spring 36 is arranged between the opposing portion 35a of the intermediate shoulder 30 which portion is opposed to the upper shoulder 10 and the opposing portion 35b of the intermediate shoulder 30 which portion is opposed to the lower shoulder 20, the opposing portion 35a of the intermediate shoulder 30 which portion is opposed to the upper shoulder 10 and the opposing portion 35b of the intermediate shoulder 30 which portion is opposed to the lower shoulder 20 can be biased in respective directions away from each other. The intermediate shoulder 30 moves along the joining direction D1 in a state where the opposing portion 35a of the intermediate shoulder 30 which portion is opposed to the upper shoulder 10 and the opposing portion 35b of the intermediate shoulder 30 which portion is opposed to the lower shoulder 20 are biased in respective directions away from each other. Therefore, even when the plate is formed so as to wave, the intermediate shoulder 30 can follow changes in shape of the plate and move while contacting both of the upper plate and the lower plate. On this account, the friction stir welding tool 100b can perform the friction stir welding in a state where the opposing portion 35a of the intermediate shoulder 30 which portion is opposed to the upper shoulder 10 and the opposing portion 35b of the intermediate shoulder 30 which portion is opposed to the lower shoulder 20 are surely in contact with the workpieces W. Thus, the friction stir welding can be performed accurately.

In the present embodiment, the spring 36 is used as the elastic body. However, the present invention is not limited to this. A component other than the spring may be used as the elastic body. For example, rubber may be used.

Embodiment 3

Next, a friction stir welding tool 100c according to Embodiment 3 of the present invention will be described. It should be noted that explanations of the same components as Embodiments 1 and 2 are omitted, and only different components will be described.

Embodiment 3 is different from Embodiments 1 and 2 regarding the positions of the beam members w3 of the workpieces W subjected to the friction stir welding. Therefore, the shape of the intermediate shoulder 30 in a front view is different from those of Embodiments 1 and 2.

Figure 9:
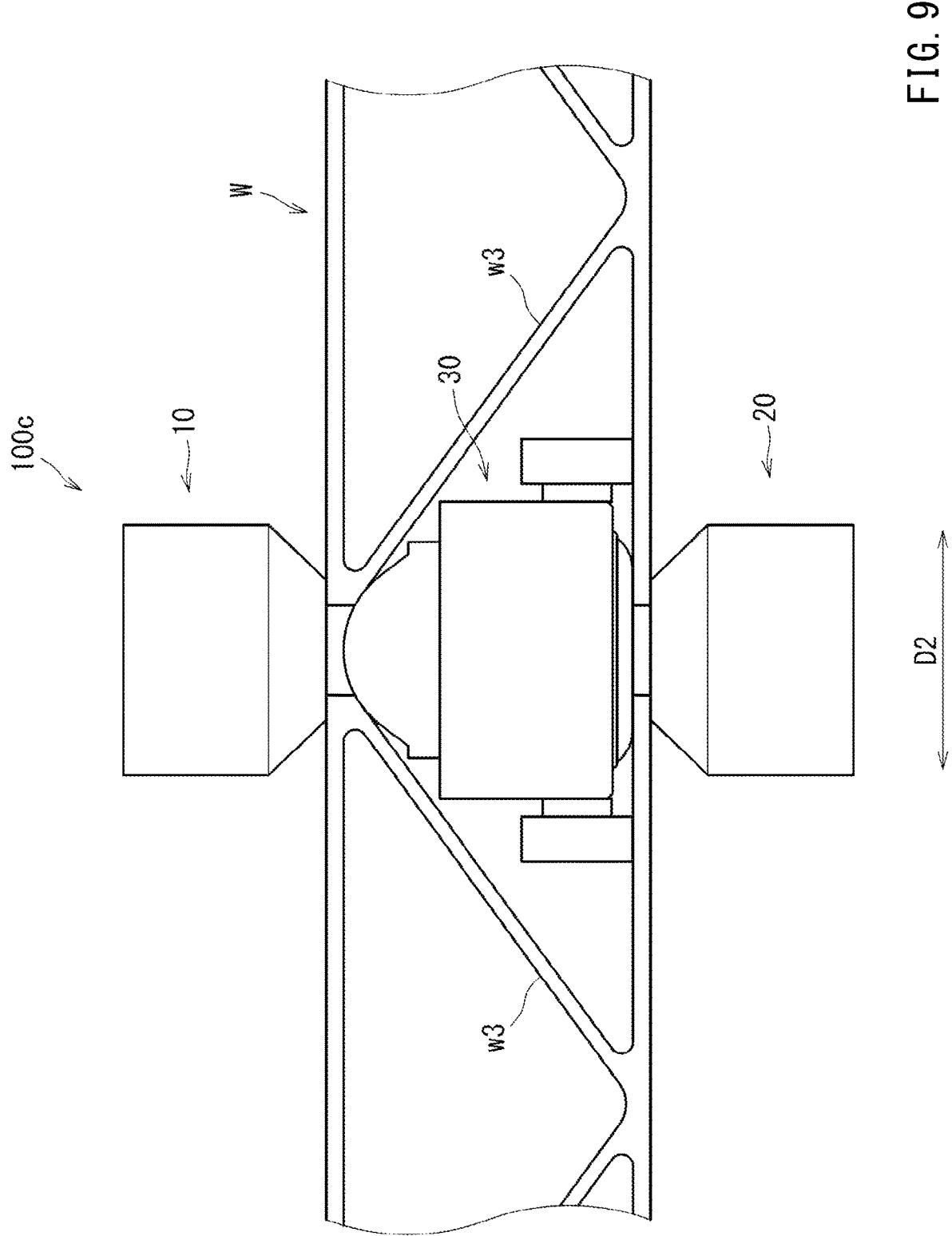
FIG. 9 is a front view showing a friction stir welding tool according to Embodiment 3 of the present invention.

As shown in FIG. 4, each of Embodiments 1 and 2 has described an example in which in a front view of the friction stir welding tool, a section of the intermediate shoulder 30 along the facing direction D2 has a rectangular shape that is long in the direction D2. On the other hand, for example, as shown in FIG. 9, Embodiment 3 is configured such that in a front view of the intermediate shoulder 30, a portion of the intermediate shoulder 30 which portion is opposed to the upper shoulder 10 curves so as to taper toward an upper side.

In Embodiment 3, an interval between the beam members w3 of the workpieces W facing each other is formed to be smaller than each of those in Embodiments 1 and 2. When the interval between the beam members w3 is made narrow, the rigidity of the workpieces W joined to each other by the friction stir welding can be improved. Therefore, when the interval between the beam members w3 is made narrow in order to improve the rigidity of the workpieces W, the length of the intermediate shoulder 30 in the facing direction D2 is made small in accordance with the interval between the beam members w3 of the workpieces W such that the intermediate shoulder 30 contacts both of the beam members w3. Moreover, the upper portion of the intermediate shoulder 30 is formed in a tapered shape in accordance with the shapes of the beam members w3 such that the length thereof in the facing direction D2 decreases toward an upper side.

The intermediate shoulder 30 is formed as above. Therefore, even when the interval between the beam members w3 of the workpieces W is narrow, the friction stir welding can be performed in a state where the intermediate shoulder 30 contacts both of the beam members w3. On this account, the positioning of the intermediate shoulder 30 can be performed by the beam members w3. Thus, the friction stir welding can be performed accurately. Moreover, since the intermediate shoulder 30 contacts the beam members w3, the beam members w3 serve as whirl stoppers for the intermediate shoulder 30. Therefore, the friction stir welding can be performed in a state where the intermediate shoulder 30 is pressed by the beam members w3 so as not to rotate by the rotation of the stirring shaft 40. On this account, the friction stir welding can be performed while maintaining a state where the intermediate shoulder 30 does not rotate. Thus, the amount of heat generated when performing the friction stir welding can be made small.

Embodiment 4

Next, a friction stir welding tool 100d according to Embodiment 4 of the present invention will be described. It should be noted that explanations of the same components as Embodiments 1 to 3 are omitted, and only different components will be described.

Each of Embodiments 1 to 3 has described an example in which each of the workpieces W to be joined to each other includes: the upper and lower plates w1 and w2; and the beam member w3 arranged between the plates. On the other hand, Embodiment 4 will describe a case where the workpieces W each having, for example, a U-shaped section are joined to each other by the friction stir welding at upper end portions thereof facing each other and lower end portions thereof facing each other.

Figure 10:
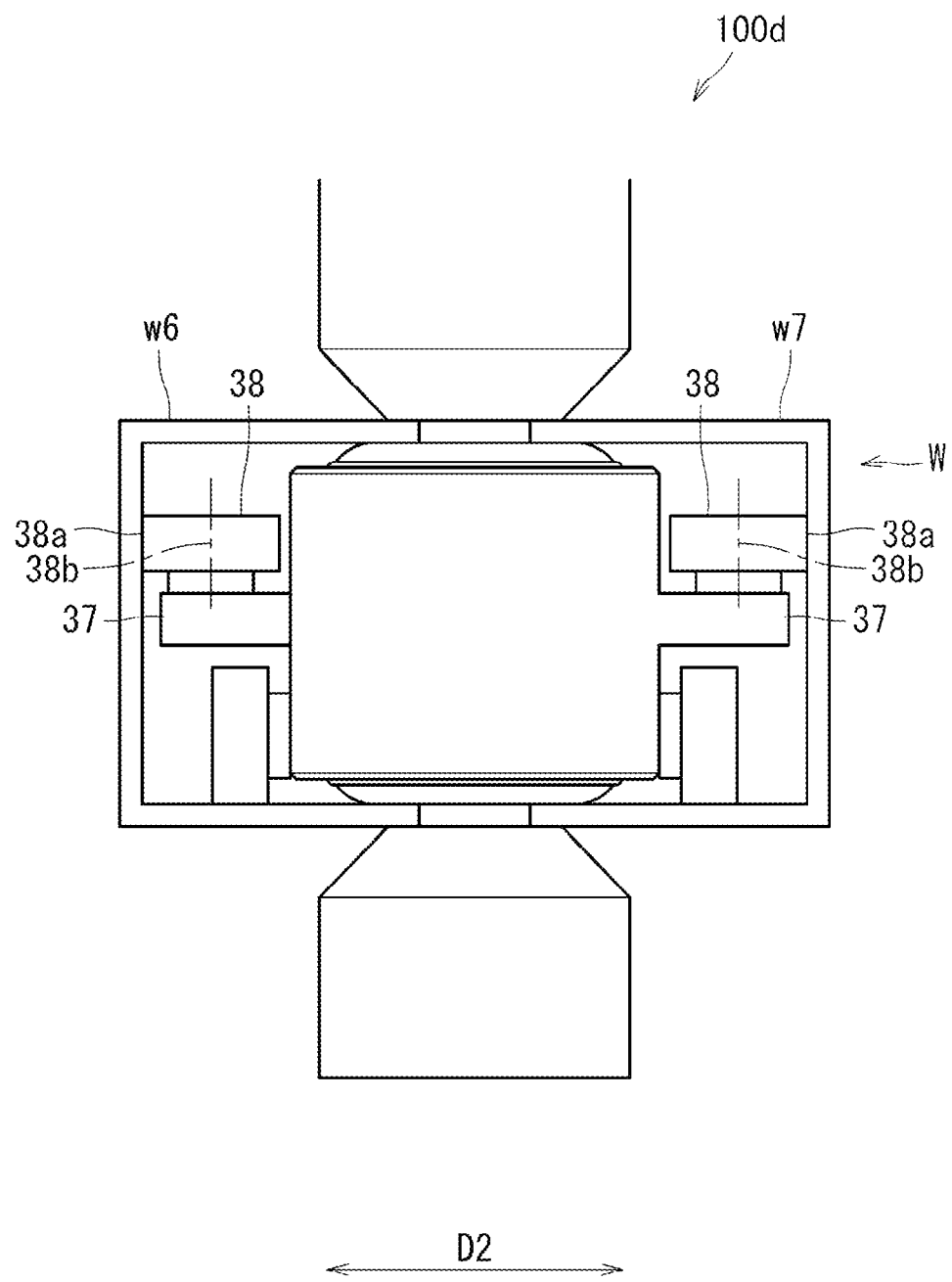
FIG. 10 is a front view showing a friction stir welding tool according to Embodiment 4 of the present invention.

As shown in FIG. 10, in Embodiment 4, each of workpieces w6 and w7 is formed in a U shape that is open inward. Edge portions of the inward opening portions are joined to each other by the friction stir welding. With this, a tubular workpiece W is formed such that a section thereof along the facing direction D2 is a rectangular closed section.

In the present embodiment, the edge portions of the opening portions of the workpieces W are arranged at the gap x1 between the upper shoulder 10 and the intermediate shoulder 30 and the gap x2 between the intermediate shoulder 30 and the lower shoulder 20 in the friction stir welding tool 100d.

Moreover, the friction stir welding is performed in such a manner that: the intermediate shoulder 30 is arranged inside a region surrounded by the U-shaped workpieces w6 and w7 that are open inward; and the friction stir welding tool 100d moves along the joining direction while rotating the stirring shaft 40.

Moreover, in Embodiment 4, the shapes of the workpieces w6 and w7 are configured such that a length between portions of the workpieces w6 and w7 which portions are opposed to each other in the facing direction D2 is relatively large in a region between the gap x1 and the gap x2 in the axial direction. The intermediate shoulder 30 includes projecting portions 37 projecting outward in the facing direction D2 such that the intermediate shoulder 30 can contact the workpieces w6 and w7 even when the length between the portions of the workpieces w6 and w7 which portions are opposed to each other in the facing direction D2 is relatively large.

The intermediate shoulder 30 includes rollers 38. Each of the rollers 38 is rotatably provided at an end portion of the corresponding projecting portion 37 which portion is located outside in the facing direction D2. Moreover, the roller 38 is provided at the projecting portion 37 such that part of an outer peripheral surface 38a thereof which part is located outside in the facing direction D2 protrudes outward in the facing direction D2 beyond the projecting portion 37. The rollers 38 are arranged such that rotation axes 38b thereof are parallel to the rotation axis of the stirring shaft 40. The portions of the outer peripheral surfaces 38a of the two rollers 38 which portions protrude outward beyond the projecting portions 37 are brought into contact with the respective workpieces w6 and w7.

The intermediate shoulder 30 includes the projecting portions 37 and the rollers 38, and the rollers 38 are attached to tip end portions, located outside in the facing direction D2, of the projecting portions 37. Therefore, even when a distance from the intermediate shoulder 30 to each workpiece in the facing direction D2 is long, the intermediate shoulder 30 can contact the workpieces w6 and w7 through the projecting portions 37 and the rollers 38.

When the friction stir welding tool 100d moves in the joining direction D1, the rollers 38 roll in a direction along the joining direction D1. Therefore, friction generated between the intermediate shoulder 30 and the workpieces w6 and w7 can be made small. Thus, the intermediate shoulder 30 can be made to move smoothly in the joining direction D1.

Since the friction stir welding is performed in a state where the workpieces w6 and w7 and the intermediate shoulder 30 are in contact with each other through the projecting portions 37 and the rollers 38, the positioning of the intermediate shoulder 30 can be performed by the workpieces w6 and w7.

Moreover, since the friction stir welding is performed in a state where the workpieces w6 and w7 and the intermediate shoulder 30 are in contact with each other through the projecting portions 37 and the rollers 38, the friction stir welding can be performed in a state where the intermediate shoulder 30 is supported by the workpieces w6 and w7. Therefore, the workpieces w6 and w7 can serve as whirl stoppers for the intermediate shoulder 30. With this, the friction stir welding can be performed in a state where the whirl-stop of the intermediate shoulder 30 is being performed, i.e., in a state where even when the stirring shaft 40 rotates, the intermediate shoulder 30 does not rotate by the rotation of the stirring shaft 40.

Embodiment 5

Next, a friction stir welding tool 100e according to Embodiment 5 of the present invention will be described. It should be noted that explanations of the same components as Embodiments 1 to 4 are omitted, and only different components will be described.

Figure 11:
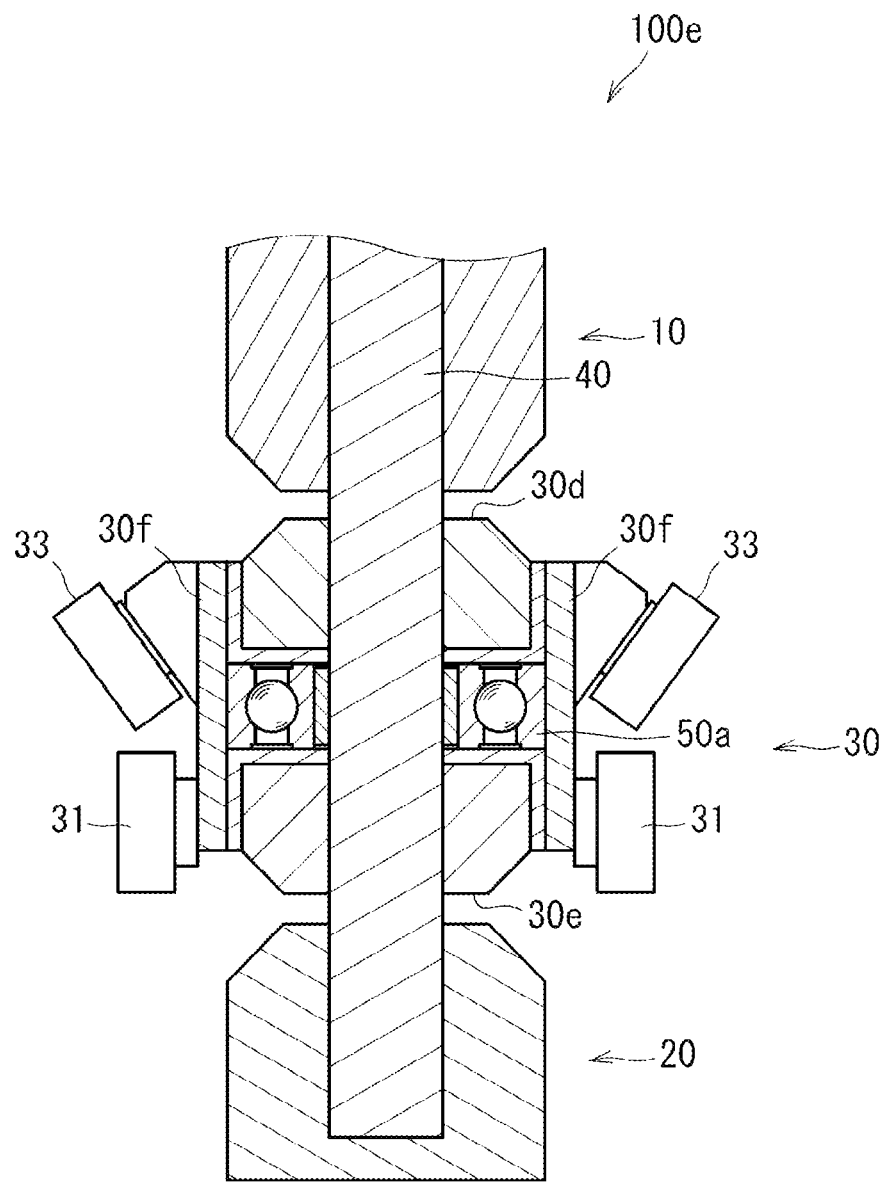
FIG. 11 is a sectional view showing a friction stir welding tool according to Embodiment 5 of the present invention.

FIG. 11 is a sectional view showing the friction stir welding tool 100e according to Embodiment 5. In Embodiments 1 to 4, the entire intermediate shoulder 30 is arranged around the axis of the stirring shaft 40 through the bearing 50. Therefore, the entire intermediate shoulder 30 is configured to be able to be prevented from performing the same rotation as the stirring shaft 40 when the stirring shaft 40 rotates. On the other hand, in the friction stir welding tool 100e of Embodiment 5, the intermediate shoulder 30 includes: a first opposing portion 30d opposed to the upper shoulder 10; a second opposing portion 30e opposed to the lower shoulder 20; and a lateral peripheral wall portion 30f including the wheels 31 and the whirl-stop portions 33. The peripheral wall portion 30f of the intermediate shoulder 30 is arranged around the axis of the stirring shaft 40 through a bearing 50a. Therefore, the peripheral wall portion 30f is attached so as to be rotatable relative to the stirring shaft 40. Moreover, the stirring shaft 40 passes through the inside of the first opposing portion 30d and the inside of the second opposing portion 30e, and the first opposing portion 30d and the second opposing portion 30e are fixed around the axis of the stirring shaft 40 and are unrotatable relative to the stirring shaft 40. Therefore, when the stirring shaft 40 is rotated, the peripheral wall portion 30f does not rotate, but the first opposing portion 30d and the second opposing portion 30e rotate by the rotation of the stirring shaft 40.

The friction stir welding tool 100e is configured as above. Thus, the friction stir welding can be performed by using the friction stir welding tool 100e while the first opposing portion 30d and the second opposing portion 30e rotate by the rotation of the stirring shaft 40. Therefore, the friction stir welding can be performed at both of the upper and lower sides of the workpieces contacting the friction stir welding tool 100e while the friction stir welding tool 100e rotates relative to the workpieces at both front and back surfaces of the workpieces. On this account, the friction stir welding can be performed while generating high frictional heat between the friction stir welding tool 100e and the workpieces. As above, the friction stir welding tool 100e may be configured to perform the friction stir welding while the first opposing portion 30d and the second opposing portion 30e in the intermediate shoulder 30 rotate by the rotation of the stirring shaft 40.

In this case, the peripheral wall portion 30f is configured to be rotatable relative to the stirring shaft 40. Therefore, when performing the friction stir welding, the wheels 31 can stably roll on the workpieces in the joining direction D1. On this account, the intermediate shoulder 30 can move in the joining direction D1. Moreover, in this case, the friction stir welding is performed in a state where the whirl-stop portions 33 contact the workpieces while rolling in the joining direction D1. Therefore, the whirl-stop portions 33 perform the whirl-stop of the intermediate shoulder 30 such that when the stirring shaft 40 rotates, the intermediate shoulder 30 does not rotate by the rotation of the stirring shaft 40.

As a result, the friction stir welding may be performed while the portion of the intermediate shoulder 30 which portion is opposed to the upper shoulder 10 and the portion of the intermediate shoulder 30 which portion is opposed to the lower shoulder 20 rotate by the rotation of the stirring shaft 40, or the friction stir welding may be performed while the portion of the intermediate shoulder 30 which portion is opposed to the upper shoulder 10 and the portion of the intermediate shoulder 30 which portion is opposed to the lower shoulder 20 do not rotate by the rotation of the stirring shaft 40.

REFERENCE SIGNS LIST 10 upper shoulder (first shoulder portion)
20 lower shoulder (second shoulder portion)
30 intermediate shoulder (third shoulder portion)
31 wheel (rolling portion)
33 whirl-stop portion
35a opposing portion (first opposing portion)
35b opposing portion (second opposing portion)
36 spring (elastic body)
39 contact portion (inclination preventing portion)
40 stirring shaft
50 bearing portion (radial bearing)
R1 friction stir welding region (first friction stir welding region)
R2 friction stir welding region (second friction stir welding region)
x1 gap (first gap portion)
x2 gap (second gap portion)

The invention claimed is:

1. A friction stir welding tool configured to perform friction stir welding of first and second facing portions each constituted by making a plurality of end portions of workpieces face each other,
the friction stir welding tool comprising:
a stirring shaft;
a first shoulder portion provided so as to be unrotatable relative to the stirring shaft and configured to rotate together with the stirring shaft when the stirring shaft rotates;
a second shoulder portion provided so as to be unrotatable relative to the stirring shaft and configured to rotate together with the stirring shaft when the stirring shaft rotates; and
a third shoulder portion attached around the stirring shaft so as to be located at a position between the first shoulder portion and the second shoulder portion, wherein:
a first gap portion into which the first facing portion is inserted is formed between the first shoulder portion and the third shoulder portion;
a second gap portion into which the second facing portion is inserted is formed between the second shoulder portion and the third shoulder portion; and
the third shoulder portion includes an inclination preventing portion configured to prevent inclination of the stirring shaft during the friction stir welding by contacting the workpieces to receive reaction force from the workpieces.

2. The friction stir welding tool according to claim 1, wherein the inclination preventing portion comprises at least one contact portion configured to contact the workpieces at a position outside first and second friction stir welding regions in a direction along a joining line of the first facing portion and a joining line of the second facing portion in the third shoulder portion, the first friction stir welding region being a region where the friction stir welding is performed at the first gap portion, the second friction stir welding region being a region where the friction stir welding is performed at the second gap portion.

3. The friction stir welding tool according to claim 2, wherein the at least one contact portion comprises a second shoulder portion-side contact portion configured to contact the workpiece at a position of the third shoulder portion which position is located at the second shoulder portion side.

4. The friction stir welding tool according to claim 3, wherein the at least one contact portion comprises a first shoulder portion-side contact portion configured to contact the workpiece at a position of the third shoulder portion which position is located close to the first shoulder portion.

5. The friction stir welding tool according to claim 2, wherein the contact portion is a rolling portion configured to roll in the direction along the joining lines.

6. The friction stir welding tool according to claim 5, wherein the rolling portion is a cylindrical roller.

7. The friction stir welding tool according to claim 1, wherein:
the third shoulder portion includes
a first opposing portion opposed to the first shoulder portion through the first gap portion,
a second opposing portion opposed to the second shoulder portion through the second gap portion, and
an elastic body arranged between the first opposing portion and the second opposing portion; and
the first opposing portion and the second opposing portion are configured to be movable relative to each other in an axial direction of the stirring shaft.

8. The friction stir welding tool according to claim 1, wherein the third shoulder portion includes a whirl-stop portion configured to prevent rotation of the third shoulder portion during rotation of the stirring shaft.

9. The friction stir welding tool according to claim 8, wherein the whirl-stop portion contacts the workpiece to prevent the rotation of the third shoulder portion.

10. The friction stir welding tool according to claim 9, wherein the whirl-stop portion is a cylindrical roller configured to roll in the direction along the joining lines when the third shoulder portion moves along the joining lines.

11. The friction stir welding tool according to claim 1, further comprising a radial bearing between the stirring shaft and the third shoulder portion, wherein
the third shoulder portion is attached around the stirring shaft through the radial bearing.

12. A friction stir welding method of performing friction stir welding by using a friction stir welding tool,
the friction stir welding tool including:
a stirring shaft;
a first shoulder portion configured to be unrotatable relative to the stirring shaft and rotate together with the stirring shaft when the stirring shaft rotates;
a second shoulder portion configured to be unrotatable relative to the stirring shaft and rotate together with the stirring shaft when the stirring shaft rotates; and
a third shoulder portion attached around the stirring shaft so as to be located at a position between the first shoulder portion and the second shoulder portion,
the friction stir welding method comprising:
sandwiching a first facing portion in a first gap portion formed between the first shoulder portion and the third shoulder portion, the first facing portion being formed by making a plurality of end portions of workpieces face each other;
sandwiching a second facing portion in a second gap portion formed between the second shoulder portion and the third shoulder portion, the second facing portion being formed by making a plurality of end portions of workpieces face each other; and
performing the friction stir welding while preventing inclination of the stirring shaft in such a manner that the third shoulder portion contacts the workpieces to receive reaction force from the workpieces.

13. The friction stir welding method according to claim 12, wherein in the step of performing the friction stir welding, the inclination of the stirring shaft is prevented in such a manner that the third shoulder portion contacts the workpieces at positions outside a first friction stir welding region and a second friction stir welding region in a direction along a joining line of the first facing portion and a joining line of the second facing portion, the first friction stir welding region being a region where the friction stir welding is performed at the first gap portion, the second friction stir welding region being a region where the friction stir welding is performed at the second gap portion.

* * * * *